United States Patent
Sahli et al.

(10) Patent No.: US 9,867,502 B2
(45) Date of Patent: Jan. 16, 2018

(54) GRINDER FOR GRINDING COFFEE BEANS AS WELL AS COFFEE MACHINE COMPRISING SUCH A GRINDER

(71) Applicant: JURA Elektroapparate AG, Niederbuchsiten (CH)

(72) Inventors: Georg Sahli, Ersigen (CH); Stephan Probst, Subingen (CH); Philipp Büttiker, Oberbuchsiten (CH)

(73) Assignee: JURA Elektroapparate AG, Niederbuchsiten (CH)

( * ) Notice: Subject to any disclaimer, the term of this patent is extended or adjusted under 35 U.S.C. 154(b) by 224 days.

(21) Appl. No.: 14/823,387

(22) Filed: Aug. 11, 2015

(65) Prior Publication Data
US 2016/0045071 A1 Feb. 18, 2016

(30) Foreign Application Priority Data
Aug. 12, 2014 (EP) ..................................... 14405061

(51) Int. Cl.
| | | |
|---|---|---|
| *A47J 42/00* | (2006.01) | |
| *A47J 42/10* | (2006.01) | |
| *A47J 42/02* | (2006.01) | |
| *A47J 31/42* | (2006.01) | |
| *A47J 42/20* | (2006.01) | |

(52) U.S. Cl.
CPC ............... *A47J 42/10* (2013.01); *A47J 31/42* (2013.01); *A47J 42/00* (2013.01); *A47J 42/02* (2013.01); *A47J 42/20* (2013.01)

(58) Field of Classification Search
CPC .. A47J 42/10; A47J 42/20; A47J 31/42; A47J 42/02; A47J 42/00

USPC ........................................................ 241/169.1
See application file for complete search history.

(56) References Cited

U.S. PATENT DOCUMENTS

| | | |
|---|---|---|
| 7,604,191 B2 | 10/2009 | Pai |
| 7,604,192 B2 | 10/2009 | Tang |
| 7,637,447 B2 | 12/2009 | Tang |
| 8,240,586 B2 | 8/2012 | Wilson et al. |
| 8,376,255 B2 | 2/2013 | Wilson et al. |
| 8,480,017 B2 | 7/2013 | Pai |
| 8,534,579 B2 | 9/2013 | Carapelli |
| 8,960,580 B2 | 2/2015 | Zhang |

FOREIGN PATENT DOCUMENTS

| | | |
|---|---|---|
| DE | 849 600 | 9/1952 |
| DE | 38 03 619 | 5/1989 |
| DE | 195 14 794 | 10/1996 |
| DE | 196 38 824 | 3/1998 |
| EP | 2 050 375 | 4/2009 |
| EP | 2 050 377 | 4/2009 |

OTHER PUBLICATIONS

European Search Report for EP application 14 40 5061.4 dated Jan. 12, 2015.
United States Patent and Trademark Office, Office Action for U.S. Appl. No. 14/823,374, dated Oct. 25, 2017, 8 pages, U.S.A.

*Primary Examiner* — Faye Francis
(74) *Attorney, Agent, or Firm* — Alston & Bird LLP

(57) ABSTRACT

What is described is a new grinder, which serves to grind coffee beans and which is embodied as disk grinder. To improve the grinding process, the first and/or second grinding disk, respectively, encompass grinding surfaces that may define an angle of inclination, which may be in each case greater than 90° and smaller than 180°, relative to a tool reference plane.

18 Claims, 12 Drawing Sheets

GRINDER FOR GRINDING COFFEE BEANS AS WELL AS COFFEE MACHINE COMPRISING SUCH A GRINDER

CROSS-REFERENCE TO RELATED APPLICATION

This application claims priority to European Patent Application No. EP 14405061.4, filed Aug. 12, 2014, which application is incorporated by reference herein in its entirety.

FIELD OF THE INVENTION

The invention relates to a grinder, which serves to grind coffee, as well as to a coffee machine, which is equipped with such a grinder.

BACKGROUND OF THE INVENTION

A plurality of grinders for grinding food, in particular coffee beans, is known per se, wherein the latter are always broken between two grinding elements, which are moved against each other. As a function of the design of the grinders, a differentiation is made between conical grinders and disk grinders.

Conical grinders are thus known in particular from EP 2 050 375 A1, from DE 195 14 794 A1, from DE 196 38 824 A1 (in particular FIG. 16 and description column 9, lines 43 et seqq. therein) and from DE 849 600 (in particular according to FIG. 2 and description page 2, lines 38 et seqq. therein).

In general, conical grinders of the state of the art encompass a first grinding element, which is designed in a conical manner and which is thus also called grinding cone. Said grinding cone is supported so as to be rotatable about an axis of rotation. A second grinding element, which is identified as grinding ring, is arranged coaxially to this axis of rotation and substantially around the tapered surface of the grinding cone. On its inner side, which is spaced apart from the grinding cone by embodying a grinding slit, the grinding ring also encompasses a substantially conical shape. On their sides located opposite one another, the grinding cone as well as the grinding ring have spirally arranged grinding surfaces, which are formed by teeth. In response to operation of a coffee machine, which is equipped with a conical grinder, the coffee beans, which are to be ground, are transported from an entrance area or entrance slit, respectively, of the grinder, to the exit area or exit slit thereof, respectively, by means of relative movement of the grinding cone with respect to the grinding ring through the grinding grooves, which are embodied between the teeth. During this transport, the individual coffee beans are moved against the respective grinding surfaces of the teeth and are comminuted by them by means of clamping. To ensure the comminution of the coffee beans, each grinding surface of the grinding cone is arranged such that it defines one of the grinding grooves of the grinding cone at a "rear" side of the respective grinding groove—with regard to the direction of the relative movement of the grinding cone relative to the grinding ring. Accordingly, each grinding surface of the grinding ring is arranged such that it defines one of the grinding grooves of the grinding ring at a "rear" side of the respective grinding groove—with regard to the direction of the relative movement of the grinding ring relative to the grinding cone.

In the case of disk grinders, which are known, for example, from DE 196 38 824 A1 (in particular FIG. 1 and description column 7, lines 26 et seqq. therein) as well as from DE 38 03 619 C2, the first grinding element and the second grinding element are in each case embodied in a substantially disk-shaped manner (as so-called grinding disks). The two grinding disks (hereinbelow also referred to as "first grinding disk" and "second grinding disk") are arranged parallel to one another about a common axis of rotation by embodying a grinding slit and in each case encompass grinding surfaces, which are formed by teeth, on their opposite sides. In response to operation of a coffee machine, which is equipped with a disk grinder, the coffee beans, which are to be ground, are transported from an entrance area or entrance slit, respectively, of the grinder, to the exit area or exit slit thereof, respectively, by means of relative movement of the two grinding disks through the grinding grooves, which are embodied between the teeth. During this transport, the individual coffee beans are moved against the respective grinding surfaces of the teeth and are comminuted by them by means of clamping. To ensure the comminution of the coffee beans, each grinding surface of the first grinding disk is arranged such that it defines one of the grinding grooves of the first grinding disk at a "rear" side of the respective grinding groove—with regard to the direction of the relative movement of the first grinding disk relative to the second grinding disk. Accordingly, each grinding surface of the second grinding disk is arranged such that it defines one of the grinding grooves of the second grinding disk at a "rear" side of the respective grinding groove—with regard to the direction of the relative movement of the second grinding disk relative to the first grinding disk.

The grinding level, that is, the granulation of the ground coffee powder, can be adjusted via the distance of the two grinding elements relative to one another, via the number of the teeth as well as the height and angle of inclination thereof, among others. In particular, provision can be made for the number of the teeth to increase from the entrance area of the grinder to the exit area thereof, while the height of the respective teeth decreases from the entrance area to the exit area thereof. The known principle of comminuting the coffee beans is maintained in any event.

The design of the teeth or of the grinding surfaces, respectively, of known grinders will be explained below in an exemplary manner by means of publication DE 196 38 824 A1 (see FIG. 16 and FIG. 1 therein).

To simplify and standardize the illustration below, the following convention shall apply for conical grinders comprising two grinding elements in the form of a grinding cone and of a grinding ring of the above-mentioned type (for grinders of the state of the art as well as for the grinders according to the invention):

Point P:
  This is a fictitious point P on a grinding surface of one of the grinding elements of the grinder, in particular on a cutting edge.

Axis of rotation R:
  At least one of the grinding elements and in particular the point P rotates about this axis of rotation, relative to the respective other grinding element on a circular path.

Direction of rotation M:
  This is the direction, about which the grinding element, which rotates about the axis of rotation R, moves.

Grinding direction S:
  This is the direction of movement of the point P in response to a rotation of one of the grinding elements in the direction of rotation M (this direction of movement is located on a tangent through the point P to the circle, on which the point P moves about the axis of rotation R relative to the respective other grinding element). Due to the fact that each of the grinding elements moves relative to the respective other grinding element, the two grinding elements act in different directions on a coffee bean. This is why a differentiation will be made below, if necessary, between a grinding direction S1 for a point P on one of the grinding elements and a grinding direction S2 for a point P on the other one of the grinding elements.

Tool reference plane E-I:
This is a plane in point P, which is embodied parallel to the grinding direction S and parallel to the axis of rotation R.

Assumed working plane E-II:
This is a plane, which is oriented orthogonally to the axis of rotation R and parallel to the grinding direction S, through the point P.

Grinding edge plane E-III:
This is a plane through the point P, which stands vertically on the tool reference plane E-I and vertically to the grinding direction S.

Angle of inclination φ:
This is the angle between the grinding surface and the tool reference plane E-I, measured at the assumed working plane E-II in the grinding direction S. The angle of inclination φ is positive, when viewed originating from the grinding surface counter-clockwise in the direction of the tool reference plane E-I or in the direction of the grinding direction S, respectively.

In this document, which is at hand here, FIG. 16, which is known from DE 196 38 824 A1 and which shows a conical grinder, is represented as FIG. 1, wherein the grinding cone 11 and the grinding ring 15 are illustrated separate from one another (in an exploded illustration, in which the grinding ring 15 is spaced apart from the grinding cone 11 further in the direction of the axis of rotation R), whereby it is assumed that the grinding cone 11 rotates relative to the grinding ring 15 about the axis of rotation R, which is illustrated in FIG. 1. The axis of rotation R and the direction of rotation M can be seen well in this figure.

The grinding direction S1 as well as the tool reference plane E-I, the working plane E-II and the grinding edge plane E-III are delineated on a freely chosen point P on the grinding surface 30 of the grinding cone 11. A point P, at which the corresponding grinding direction S2 as well as the tool reference plane E-I, the working plane E-II and the grinding edge plane E-III are delineated, is also chosen freely on a grinding surface 31 of the grinding ring 15. With regard to the grinding directions S1 and S2, it is important to note that, if the grinding cone 11 is rotated in the direction of rotation M about the axis of rotation R, the grinding ring 15 rotates relative to the grinding cone 11 in a direction of rotation opposite to the direction of rotation M. Accordingly, the grinding direction S1 is oriented in the direction of rotation M and the grinding direction S1 is oriented opposite to the direction of rotation M.

A section through the grinding cone 11, which is shown on the bottom in FIG. 1, can be seen in top view in FIG. 2, wherein the cut surface through the point P is located in the assumed working plane E-II. The angle of inclination φ of the grinding surface 30, thus the angle between the grinding surface 30 and the tool reference plane E-I, measured at the assumed working plane E-II in the grinding direction S1, is smaller than 90°.

The same applies with regard to the grinding surface 31 of the grinding ring 15 at the point P on the grinding surface 31 according to FIG. 1: the angle of inclination of the grinding surface 31, thus the angle between the grinding surface 31 and the tool reference plane E-I, measured at the assumed working plane E-II in the grinding direction S2, is smaller than 90° (not illustrated in the figures).

The disk grinder of FIG. 10 of DE 196 38 824 A1 is shown in FIG. 3 of this document. As mentioned above, the disk grinder encompasses the first disk-shaped grinding element 11' (referred to hereinbelow as grinding disk 11') and the second disk-shaped grinding element 15' (referred to hereinbelow as grinding disk 15'). Coffee beans 3 are located in the grinding slit embodied between the grinding disks 11', 15'. It is furthermore assumed that the grinding disk 11' carries out a rotation about the axis of rotation R in a direction of rotation M relative to the grinding disk 15'. In response to the rotation of the grinding disk 11' (relative to the grinding disk 15') about the axis of rotation R in direction of rotation M, the coffee beans 3 are clamped and broken between a grinding surface 30, which is embodied at the first grinding disk 11', and a grinding surface 31, which is embodied at the second grinding disk 15'. An arbitrary point P is also defined in FIG. 3 in each case for the upper grinding disk 15' and the lower grinding disk 11' on the grinding surface 30 or an arbitrary point P is defined on the grinding surface 31, respectively.

The two grinding disks 11', 15' extend substantially vertically to the axis of rotation R. This is why the grinding surfaces 30 and 31 of the grinding disks 11', 15' extend substantially parallel to a plane, which is arranged vertically to the axis of rotation R.

To simplify and standardize the illustration below, the following conventions shall apply for disk grinders comprising two grinding elements in the form of grinding disks of the above-mentioned type (for grinders of the state of the art as well as for the grinders according to the invention):

Point P:
This is a fictitious point P on a grinding surface of one of the (two) grinding elements, in particular on a cutting edge.

Axis of rotation R:
At least one of the grinding elements and in particular the point P rotates about this axis of rotation, relative to the respective other grinding element on a circular path.

Direction of rotation M:
This is the direction, about which the grinding element, which rotates about the axis of rotation R, moves (relative to the respective other grinding element).

Grinding direction S:
This is the direction of movement of the point P in response to a rotation of one of the grinding elements in the direction of rotation M (this direction of rotation is located on a tangent through the point P to the circle, on which the point P moves about the axis of rotation R relative to the respective other grinding element). Due to the fact that each of the grinding elements moves relative to the respective other grinding element, the two grinding elements act in different directions on a coffee bean. This is why a differentiation will be made below, if necessary, between a grinding direction S1 for a point P on one of the grinding elements and a grinding direction S2 for a point P on the other one of the grinding elements.

Tool reference plane E-I:
This is a plane in point P, which is embodied parallel to the grinding direction S and vertically to the axis of rotation R.

Assumed working plane E-II:
This is a plane, which is oriented parallel to the axis of rotation R and parallel to the grinding direction S, through the point P.

Grinding edge plane E-III:

This is a plane through the point P, which stands vertically on the tool reference plane E-I and vertically to the grinding direction S.

Angle of inclination φ:

This is the angle between the grinding surface and the tool reference plane E-I, measured at the assumed working plane E-II in the grinding direction S of the grinding surface. The angle of inclination is positive, when viewed originating from the grinding surface counter-clockwise in the direction of the tool reference plane E-I or in the direction of the grinding direction S, respectively.

Based on the above-specified conventions for disk grinders, the grinding direction S1 for the grinding surface 30 of the first grinding disk 11' and the grinding direction S2 for the grinding surface 31 of the second grinding disk 15' and the tool reference planes E-I, the assumed working planes E-II and the grinding edge planes E-III are furthermore delineated—in each case for the point P illustrated in FIG. 3 on the grinding surface 30 of the first grinding disk 11' and for the point P illustrated in FIG. 3 on the grinding surface 31 of the second grinding disk 15'.

With regard to the grinding directions S1 or S2, respectively, of the grinding surface 30 or 31, respectively, of the first grinding disk 11' or of the second grinding disk 15', respectively, it is important to note that, if the first grinding disk 11' is rotated in the direction of rotation M about the axis of rotation R, the second grinding disk 15' rotates relative to the first grinding disk 11' in a direction of rotation opposite to the direction of rotation M. Accordingly, the grinding direction S1 is oriented in the direction of rotation M and the grinding direction S2 is oriented opposite to the grinding direction M.

In the state of the art shown herein, the angle of inclination φ for the grinding surface 30 and the tool reference plane E-I, measured at the assumed working plane E-II in the grinding direction S1, is also smaller than 90°, as can easily be seen in FIG. 3.

In the state of the art shown herein, the angle of inclination φ for the grinding surface 31 and the tool reference plane E-I, measured at the assumed working plane E-II in the grinding direction S2, is accordingly also smaller than 90°, as can easily be seen in FIG. 3.

It can thus be noted that conical grinders of the state of the art comprise the following features:

a grinding cone, which has a number of teeth, which are spaced apart from one another and which are separated from one another by grinding grooves and which in each case encompass a grinding edge and a first grinding surface, which adjoins the grinding edge, a grinding ring, which has a number of teeth, which are spaced apart from one another and which are separated from one another by grinding grooves and which in each case encompass a grinding edge and a second grinding surface, which adjoins the grinding edge, wherein the grinding cone and the grinding ring are arranged coaxially along a common axis of rotation by forming a grinding slit, which extends between the grinding cone and the grinding ring, wherein the grinding cone and the grinding ring are configured to be rotated relative to one another about the common axis of rotation, so that, in response to a rotation of the grinding cone relative to the grinding ring, each first grinding surface of the grinding cone is in each case moved in a grinding direction relative to the grinding ring, so as to transport the coffee beans, which are to be ground, from an entrance slit of the grinder in the grinding grooves of the grinding cone and of the grinding ring through the grinding slit to an exit slit, which is arranged below the entrance slit, and to comminute them by means of the first grinding surfaces of the grinding cone, wherein each first grinding surface is arranged such that it defines one of the grinding grooves of the grinding cone at a rear side of the respective grinding groove relative to the grinding direction, wherein each of the first grinding surfaces of the grinding cone (11) encompasses an angle of inclination φ at an arbitrary point at the respective first grinding surface, relative to a tool reference plane, measured at an assumed working plane in the grinding direction of the respective first grinding surface, wherein the tool reference plane is a plane in the arbitrary point, which is embodied parallel to the grinding direction and parallel to the common axis of rotation, and wherein the assumed working plane is a plane, which is oriented orthogonally to the axis of rotation and parallel to the grinding direction, through the arbitrary point.

It can furthermore be noted that conical grinders of the state of the art comprise the following features:

a grinding cone, which has a number of teeth, which are spaced apart from one another and which are separated from one another by grinding grooves and which in each case encompass a grinding edge and a first grinding surface, which adjoins the grinding edge, a grinding ring, which has a number of teeth, which are spaced apart from one another and which are separated from one another by grinding grooves and which in each case encompass a grinding edge and a second grinding surface, which adjoins the grinding edge, wherein the grinding cone and the grinding ring are arranged coaxially along a common axis of rotation by forming a grinding slit, which extends between the grinding cone and the grinding ring, wherein the grinding cone and the grinding ring are configured to be rotated relative to one another about the common axis of rotation, so that, in response to a rotation of the grinding ring relative to the grinding cone, each second grinding surface of the grinding ring is in each case moved in a grinding direction relative to the grinding cone, so as to transport the coffee beans, which are to be ground, from an entrance slit of the grinder in the grinding grooves of the grinding cone and of the grinding ring through the grinding slit to an exit slit, which is arranged below the entrance slit, and to comminute them by means of the second grinding surfaces of the grinding ring, wherein each second grinding surface is arranged such that it defines one of the grinding grooves of the grinding ring at a rear side of the respective grinding groove relative to the grinding direction, wherein each of the second grinding surfaces of the grinding ring encompasses an angle of inclination φ at an arbitrary point at the respective second grinding surface, relative to a tool reference plane, measured at an assumed working plane in the grinding direction of the respective second grinding surface, wherein the tool reference plane is a plane in the arbitrary point, which is embodied parallel to the grinding direction and parallel to the axis of rotation, and wherein the assumed working plane is a plane, which is oriented orthogonally to the axis of rotation and parallel to the grinding direction, through the arbitrary point.

It can furthermore be noted that disk grinders of the state of the art encompass the following features:

- a first grinding disk, which has a number of teeth, which are spaced apart from one another and which are separated from one another by grinding grooves and which in each case encompass a grinding edge and a first grinding surface, which adjoins the grinding edge,
- a second grinding disk, which has a number of teeth, which are spaced apart from one another and which are separated from one another by grinding grooves and which in each case encompass a grinding edge and a second grinding surface, which adjoins the grinding edge,
- wherein the first grinding disk and the second grinding disk are arranged coaxially along a common axis of rotation by forming a grinding slit, which extends between the first grinding disk and the second grinding disk and which in each case extend substantially vertically to the common axis of rotation,
- wherein the first grinding disk and the second grinding disk are configured to be rotated relative to one another about the common axis of rotation, so that, in response to a rotation of the first grinding disk relative to the second grinding disk, each of the first grinding surfaces of the first grinding disk is in each case moved in a grinding direction relative to the second grinding disk, so as to transport the coffee beans, which are to be ground, from an entrance slit of the grinder in the grinding grooves through the grinding slit to an exit slit, and to comminute them by means of the first grinding surfaces of the first grinding disk, wherein each first grinding surface of the first grinding disk is arranged such that it defines one of the grinding grooves of the first grinding disk at a rear side of the respective grinding groove relative to the grinding direction,
- wherein each first grinding surface of the first grinding disk encompasses an angle of inclination φ at an arbitrary point at the respective first grinding surface, relative to a tool reference plane, measured at an assumed working plane in the grinding direction of the respective first grinding surface,
- wherein the tool reference plane is a plane in the arbitrary point, which is embodied parallel to the grinding direction and vertically to the axis of rotation, and
- wherein the assumed working plane is a plane, which is oriented parallel to the axis of rotation and parallel to the grinding direction, through the arbitrary point.

Finally, it can be noted that disk grinders of the state of the art encompass the following features:

- a first grinding disk, which has a number of teeth, which are spaced apart from one another and which are separated from one another by grinding grooves and which in each case encompass a grinding edge and a first grinding surface, which adjoins the grinding edge,
- a second grinding disk, which has a number of teeth, which are spaced apart from one another and which are separated from one another by grinding grooves and which in each case encompass a grinding edge and a second grinding surface, which adjoins the grinding edge,
- wherein the first grinding disk and the second grinding disk are arranged coaxially along a common axis of rotation by forming a grinding slit, which extends between the first grinding disk and the second grinding disk and which in each case extend substantially vertically to the common axis of rotation,
- wherein the first grinding disk and the second grinding disk are configured to be rotated relative to one another about the common axis of rotation, so that, in response to a rotation of the second grinding disk relative to the first grinding disk, each of the second grinding surfaces of the second grinding disk is in each case moved in a grinding direction relative to the first grinding disk, so as to transport the coffee beans, which are to be ground, from an entrance slit of the grinder in the grinding grooves through the grinding slit to an exit slit, and to comminute them by means of the second grinding surfaces of the second grinding disk, wherein each second grinding surface of the second grinding disk is arranged such that it defines one of the grinding grooves of the second grinding disk at a rear side of the respective grinding groove relative to the grinding direction,
- wherein each of the second grinding surfaces of the second grinding disk encompasses an angle of inclination φ at an arbitrary point at the respective second grinding surface, relative to a tool reference plane, measured at an assumed working plane in the grinding direction of the respective second grinding surface,
- wherein the tool reference plane is a plane in the arbitrary point, which is embodied parallel to the grinding direction and vertically to the axis of rotation, and
- wherein the assumed working plane is a plane, which is oriented parallel to the axis of rotation and parallel to the grinding direction, through the arbitrary point.

BRIEF SUMMARY OF THE INVENTION

While the grinders known from the state of the art have proven themselves in practice per se, there is nonetheless the need to design corresponding grinders and the coffee machines, which include them, to be even quieter.

In addition, the comminution of the coffee beans during the grinding process is to take place even more gently, so as to save the up to 1000 flavoring agents contained therein for the brewing process of the ground coffee powder, and so as to obtain a full-bodied taste of the finally brewed coffee beverage.

The instant invention is thus based on the object of specifying a grinder, which comminutes coffee beans more quietly and which simultaneously treats them more gently during the comminution process.

A further task of the invention is to specify a coffee machine, which prepares coffee quietly and aromatically.

These tasks are solved by means of a grinder comprising the features of independent patent claims 1 to 2 or by means of a coffee machine comprising the features of patent claim 9, respectively.

As compared to the grinders known from the state of the art, the grinders according to the invention, which serve to grind coffee beans, are characterized in that the angle of inclination φ of the respective grinding surface fulfils the following condition:

$$90° < \varphi < 180°$$

The above-specified convention (for conical grinders or disk grinders, respectively, of the above-mentioned type) is to be observed hereby.

The grinders according to the invention have the large advantage that, due to the geometry according to the invention of the grinding surfaces, they cut the coffee beans, which are to be ground, in a defined and fine manner and do not break them, as is known from the state of the art.

This leads to a reduced noise development during the operation of the grinder according to the invention in an advantageous manner.

This furthermore leads to a compressive stress on the individual coffee beans, which is reduced as compared to the state of the art, so that, on the one hand, the temperature of the coffee beans rises only comparatively slightly during the grinding process. On the other hand, the flavoring agents are no longer dissolved by the impact of pressure. As a whole, the grinders are thus advantageously characterized in that the coffee beans, which are to be ground, are comminuted more gently.

The grinders according to the invention are furthermore characterized in an advantageous manner in that not only the coffee beans themselves, but foreign substances, which, in practice, are unavoidably present with said coffee beans, such as husks or wood, are cut better as well. A blocking of the grinder, which is known per se from the state of the art, is reliably avoided through this.

The grinders according to the invention are driven by means of electric motor (as is known per se from the state of the art), for the purpose of which a certain current consumption is required. As compared to the grinders known from the state of the art, said current consumption is reduced in the case of the grinders according to the invention, which is advantageously associated with reduced operating costs in the case of a coffee machine, which is equipped accordingly.

As compared to the broken coffee powder, which is known from the state of the art, the coffee powder, which is cut by means of the grinders according to the invention, is charged electrostatically in an advantageous manner in the end (i.e. the build-up of electrostatically induced charges in the coffee powder during operation of the grinders according to the invention is reduced in comparison to the build-up of electrostatically induced charges in the coffee powder during operation of conventional grinders), which facilitates the complete transport of the coffee powder from the grinder into a downstream brewing unit.

BRIEF DESCRIPTION OF THE DRAWINGS

Further advantageous embodiments of the invention and in particular exemplary embodiments and details thereof will be explained below by means of the enclosed drawings, which are not limiting.

DETAILED DESCRIPTION

Figure 1:
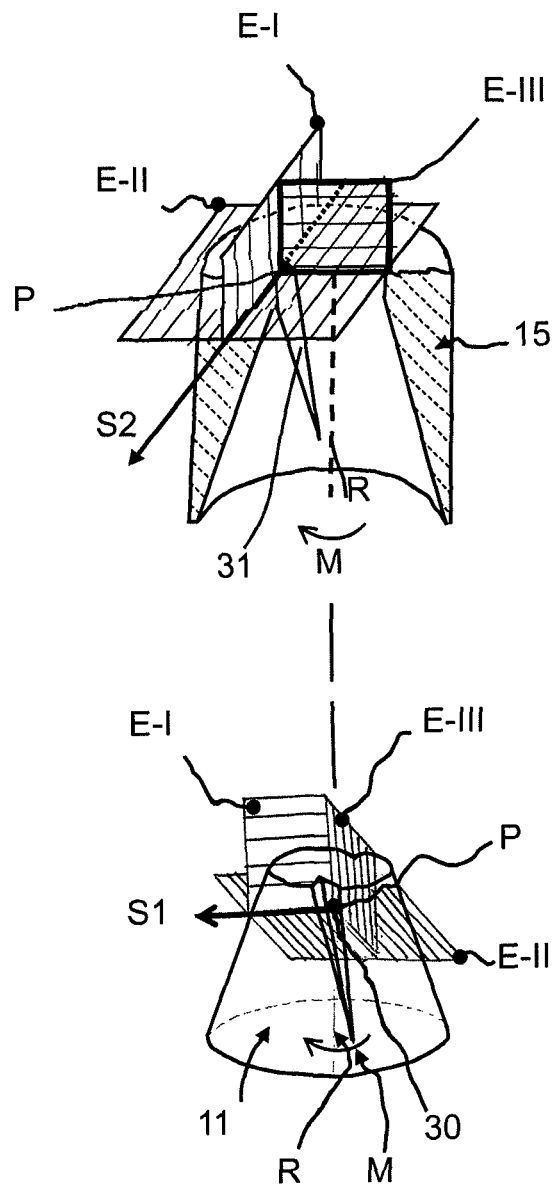
FIG. 1 shows a schematic, perspective exploded illustration of a conical grinder, which is known from the state of the art, comprising reference planes according to the convention.

Unless mentioned otherwise, the same reference numerals are in each case used for the same elements in the figures.

Since FIGS. 1 to 3, which represent the state of the art, have already been explained above, reference shall be made below directly to FIG. 4.

Figure 4:
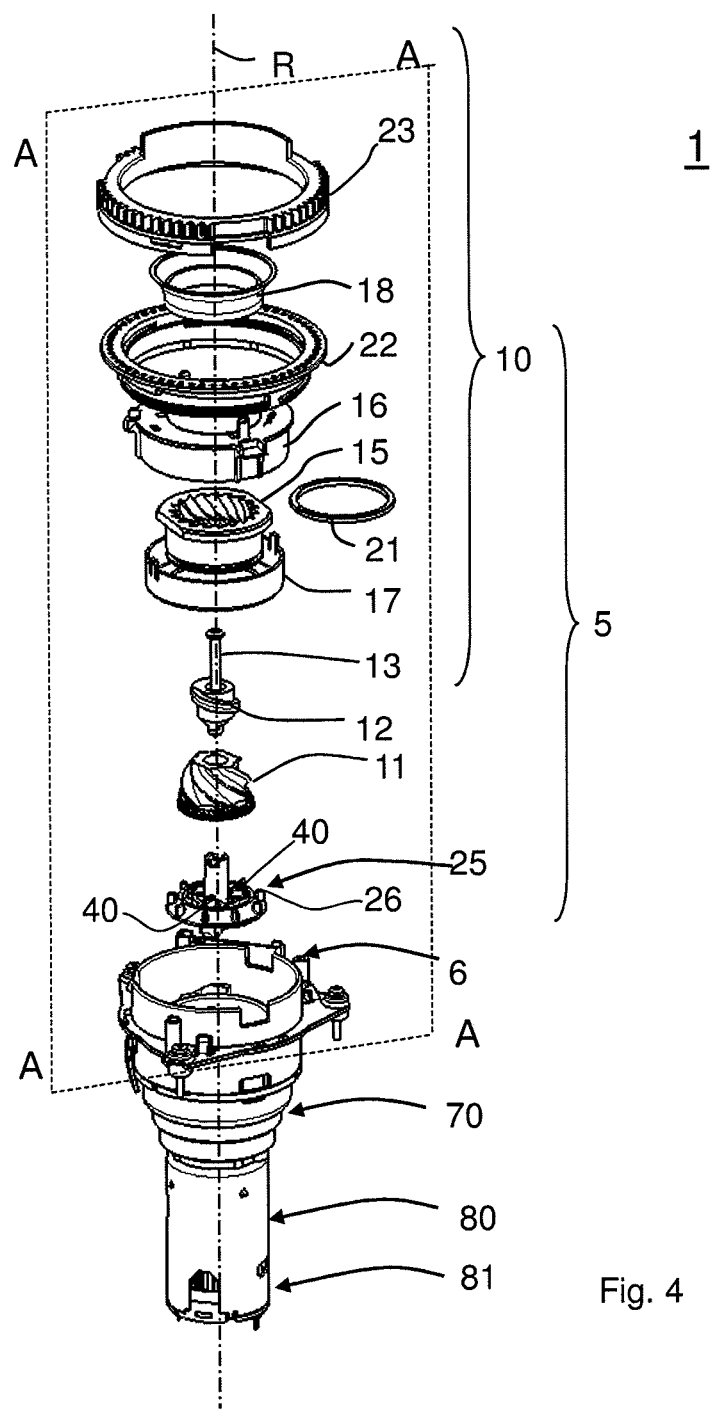
FIG. 4 shows a perspective, exploded illustration of a conical grinder according to the invention.

FIG. 4 shows a grinder 1 for grinding coffee beans, which consists of a grinding apparatus 5 comprising a drive 70 and a drive motor 80, which is located in a drive housing 81. The grinding apparatus 5 is divided into a grinding device 10 and a carrier wheel 25 comprising one or a plurality of cams 40, wherein these parts are surrounded by a housing 6 (see FIG. 5). In the instant example, the grinder 1 is embodied as conical grinder. Accordingly, the grinding device 10 encompasses a grinding cone 11 and a grinding ring 15. The grinding cone 11 is arranged so as to be rotatable about an axis of rotation R relative to the grinding ring 15. In the order from the grinding cone 11 upwards, provision is made for a rotatable conveying element 12 (embodied as worm in the instant example), a fastening screw 13, a sealing ring 21, a fastening ring 17 for the grinding ring 15, a support 16, an adjusting ring 22, a coupling element 18 and a further ring 23.

Figure 5:
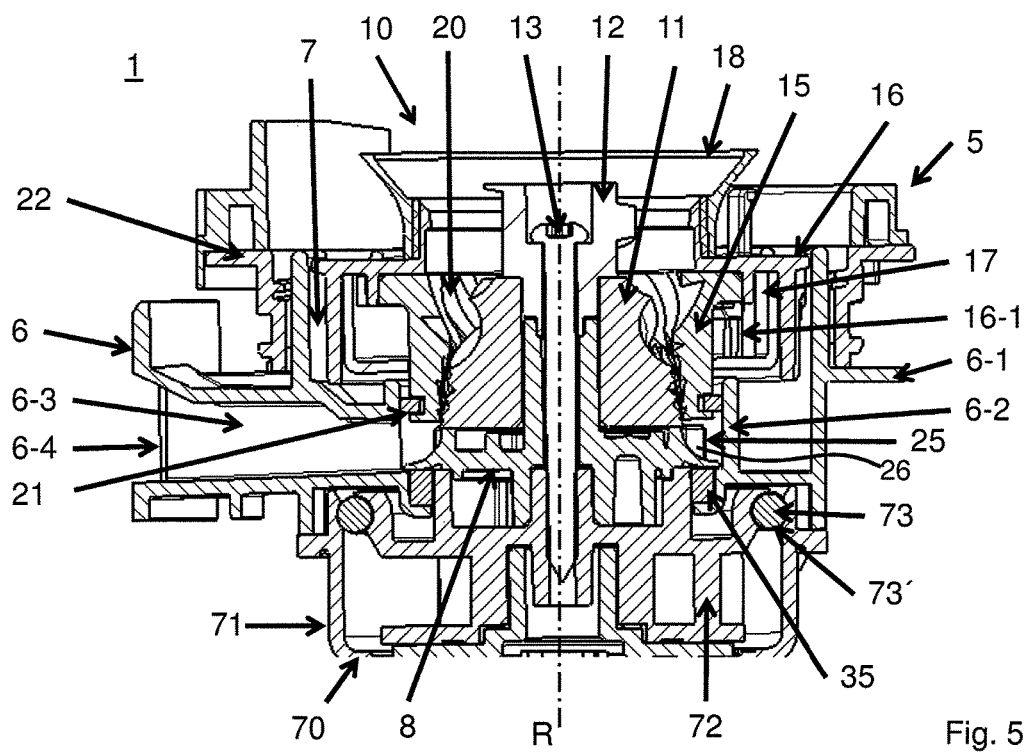
FIG. 5 shows the grinder according to FIG. 4 in a cross section through the plane A-A according to FIG. 4.

FIG. 5 shows a cross section through the grinding apparatus 5 of the grinder 1 according to the sectional line A-A in FIG. 4. Provision is made in the housing 6 for a first upper chamber 7, which accommodates the actual grinding device 10, and for a second lower chamber 8, which accommodates the carrier wheel 25 and which serves the purpose of further conveying the ground coffee powder. The housing 6 consists of a first outer wall 6-1, which defines the upper chamber 7, a second wall 6-2, which defines the lower chamber 8, an exit channel 6-3 and an exit opening 6-4, from which the ground coffee powder is dispensed from the grinder 1. The rotatable conveying element 12, which is embodied as worm in this example, serves the purpose of conveying the product, which is to be ground, or the coffee beans, along the axis of rotation R into the entrance slit 20 between the grinding cone 11 and the grinding ring 15. The grinding cone 11, the conveying element 12 and the carrier wheel 25 are fastened to a drive element 72 of the drive 70 by means of the fastening screw 13. The support 16 encompasses snap-action elements 16-1 for holding the grinding ring 15.

The fastening ring 17 is fixed to the support 16, so as to lock the snap-action elements 16-1, so that the grinding ring 15 is fixedly held on the support 16. The ring-shaped coupling element 18 consists of an elastic material (e.g. rubber or plastic) and is attached to the support 16, so as to couple a storage container (not illustrated), which can be attached from the top, for the product, which is to be ground, to the grinder 1. The sealing ring 21 is embodied as flat ring made of plastic and is clamped between the grinding ring 15 and the housing 6, so as to avoid that ground coffee powder can escape upwards. The adjusting ring 22 is supported on the housing 6 so as to be rotatable about the axis of rotation R, that is, mechanically coupled to the support 16, so that the adjusting ring 22 displaces the support 16 comprising the grinding ring 15 upwards or downwards in the direction of the axis of rotation R, whereby the grinding level of the coffee is adjusted. The carrier wheel 25 serves the purpose of transporting the ground coffee powder through the lower chamber 8 to the exit channel 6-3 by means of carrier wings 26 being arranged at the periphery of carrier wheel 25 (as indicated in FIG. 4). The carrier wheel 25 is supported so as to be rotatable about the axis of rotation R and is coupled to the grinding cone 11 via the cams 40 (illustrated in FIG. 4). A flat seal 35, for example made of felt, seals the bottom side of the carrier wheel 25 against the housing 6 and thus prevents a downwards escape of the ground coffee powder. The drive 70 consists of a drive housing 71, the drive element 72, which serves to drive the grinding cone 11 and the carrier wheel 25 together with the carrier wings 26, and a ball bearing 73 comprising balls 73', which guides the drive element 72 along the drive housing 71.

Figure 6A:
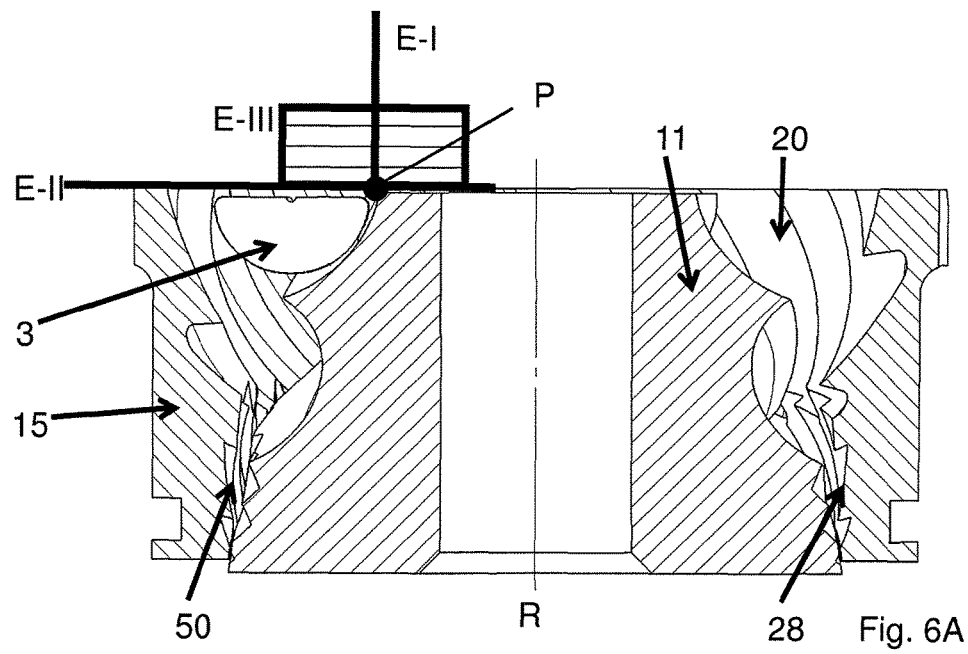
FIG. 6A shows a sectional view of the grinding cone and grinding ring shown in FIG. 4.

The grinding cone 11 as well as the grinding ring 15 are illustrated in more detail in FIGS. 6A to 6E:

FIG. 6A is a sectional view of the grinding cone 11 and of the grinding ring 15 shown in FIG. 4, wherein the grinding cone is at least partially located in the grinding ring 15. Provision is made between the grinding cone 11 and the grinding ring 15 for a grinding slit 50, which tapers from its entrance slit 20, which is shown in FIG. 6A on the top, towards its exit slit 28, which is illustrated in FIG. 6A on the bottom. A coffee bean 3, which has not been ground yet, but which, arriving from a storage container (not shown), comes to rest between the grinding cone 11 and the grinding ring 15, is located in the entrance slit 20.

An exemplary, randomly chosen point P, from which the assumed grinding direction S1 (not shown in FIG. 6A) is oriented quasi from the observer into the paper plane (see also subsequent FIG. 6C), is identified at a cutting edge of the grinding cone 11, which is shown in FIG. 6A.

According to the above-illustrated convention, the tool reference plane E-I is located in the point P and is embodied parallel to the grinding direction S1 as well as parallel to the axis of rotation R. An assumed working plane E-II of the point P is oriented orthogonally to the axis of rotation R in the point P. The grinding edge plane E-III is located vertically on the tool reference plane E-I in the point P and is thus located quasi in the paper plane of FIG. 6A.

Figure 6B:
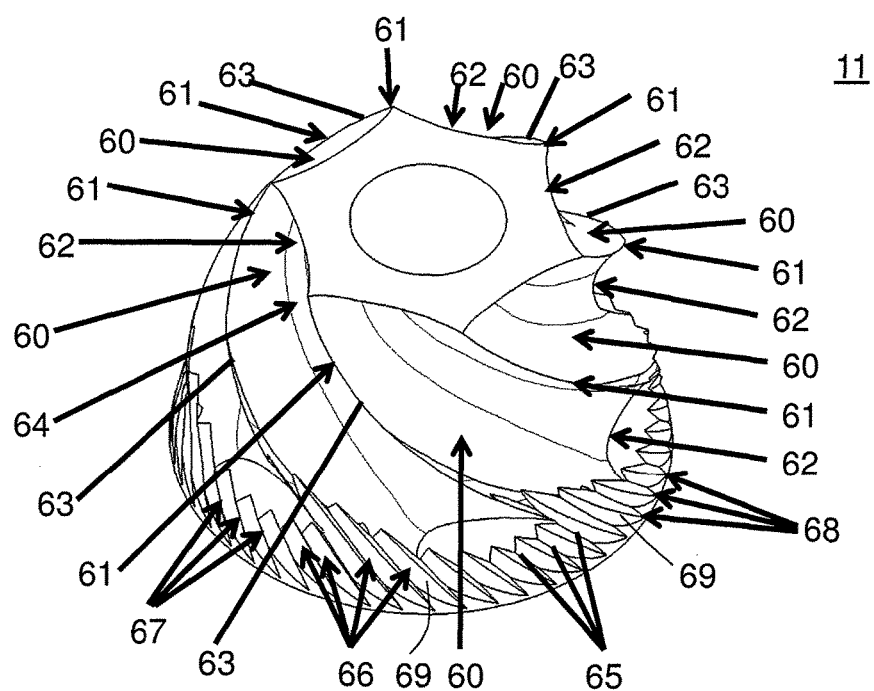
FIG. 6B shows the grinding cone shown in FIG. 4 in perspective top view.

In its upper section, the grinding cone 11 illustrated in FIG. 6B, which is known per se from the state of the art, encompasses six grinding grooves 60, which are distributed evenly across its circumference and which extend from the entrance slit 20 in a spiral or helical manner in the direction of the exit slit 28. At its respective sides, each grinding groove 60 encompasses a tooth 61, which extends in the longitudinal direction of the grinding groove 60 and which in each case comprises a grinding foot 62 and a grinding edge 63 as well as a grinding surface 64, which adjoins the grinding edge 63 and which extends to the grinding foot 62.

The lower section of the grinding cone 11 in FIG. 6A is embodied analogously, wherein the number of the grinding grooves 66 of the lower section of the grinding cone 11, thus the grinding grooves 66 located in the area of the exit slit 28, is significantly higher herein than the number of the grinding grooves 60 of the upper section of the grinding cone 11, thus such, which are provided in the area of the entrance slit 20. A two-stage grinder 1, in which the coffee beans 3 can be ground particularly evenly and finely, is created through this in an advantageous manner.

As already described with reference to the grinding grooves 60 located in the upper section of the grinding apparatus 5, the respective grinding grooves 66 located in the lower area also each have teeth 67, which extend in the longitudinal direction of the respective grinding groove 66 and which in each case encompass a grinding foot 68 and a grinding edge 65 as well as a grinding surface 69, which adjoins the grinding edge (for the sake of clarity, only some teeth 67 are identified in an exemplary manner in FIG. 6B). In this case, the grinding grooves 68 are also distributed evenly across the circumference of the grinding cone 11 and extend in a spiral or helical manner, respectively. A grinding surface 69 is in each case also provided between two adjacent grinding feet 68 and a tooth 67, which is located therebetween.

Figure 6C:
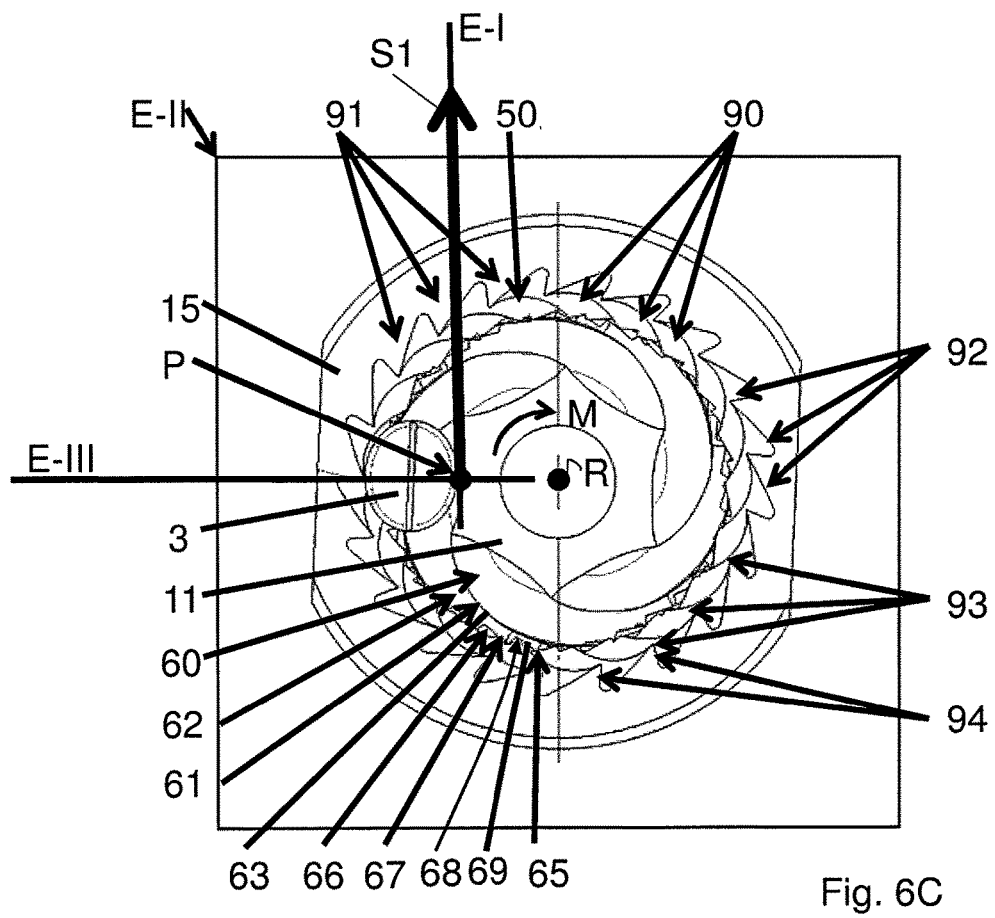
FIG. 6C shows a top view onto the grinding cone and grinding ring shown in FIG. 6A.

FIG. 6C is a top view onto the grinding cone 11 and grinding ring 15 shown in FIG. 6A. The coffee bean 3 is partially located on a grinding groove 60 of the grinding cone 11 in the grinding slit 50 and rests partially against the grinding ring 15; the arbitrary point P is chosen at this location.

In addition to the grinding groove 60, the grinding cone 11 encompasses teeth 61, grinding feet 62, grinding edges 63 and grinding surfaces 64 in its upper section in FIG. 6A, that is, in the section, which is located radially on the inside in FIG. 6C, of which only some are identified in this illustration for the sake of clarity, as already described above. In its lower section in FIG. 6A, that is, in its section, which is located radially on the outside in FIG. 6C, the grinding cone 11 furthermore encompasses grinding grooves 66, teeth 67, grinding feet 68, grinding edges 65 and grinding surfaces 69, of which also only a few are identified in FIG. 6C for the sake of clarity.

With regard to the grinding ring 15, the grinding cone 11 can rotate in the direction of rotation M about the axis of rotation R. While the axis of rotation R in FIG. 6C extends quasi orthogonally from the paper plane, the grinding direction S1 is illustrated as tangent at a circle (not shown herein), on which the point P moves about the axis of rotation R. The assumed working plane E-II is located in the paper plane of FIG. 6C, while the tool reference plane E-I and the grinding edge plane E-III stand orthogonally on the paper plane of FIG. 6C.

The design of the grinding ring 15 will be described in more detail below with reference to FIG. 6C. It is important to note that this description applies for all components of the grinding ring 15—and, on principle, also applies for the grinding cone 11—even though only individual components are identified in FIG. 6C for the sake of clarity: The grinding ring 15 encompasses grinding grooves 90, which are distributed evenly across the circumference thereof and which extend spirally or helically, respectively, on the inner side of the substantially cylindrically embodied grinding ring 15. Each grinding groove 90 is located between two adjacent teeth 91, which extend in the longitudinal direction of the respective grinding groove 90. Each tooth 91 in each case encompasses a grinding foot 92, a grinding edge 93 as well as a grinding surface 94, which adjoins the grinding edge 93 and against which the coffee bean 3 comes to rest after entering into the grinding apparatus 5.

Figure 6D:
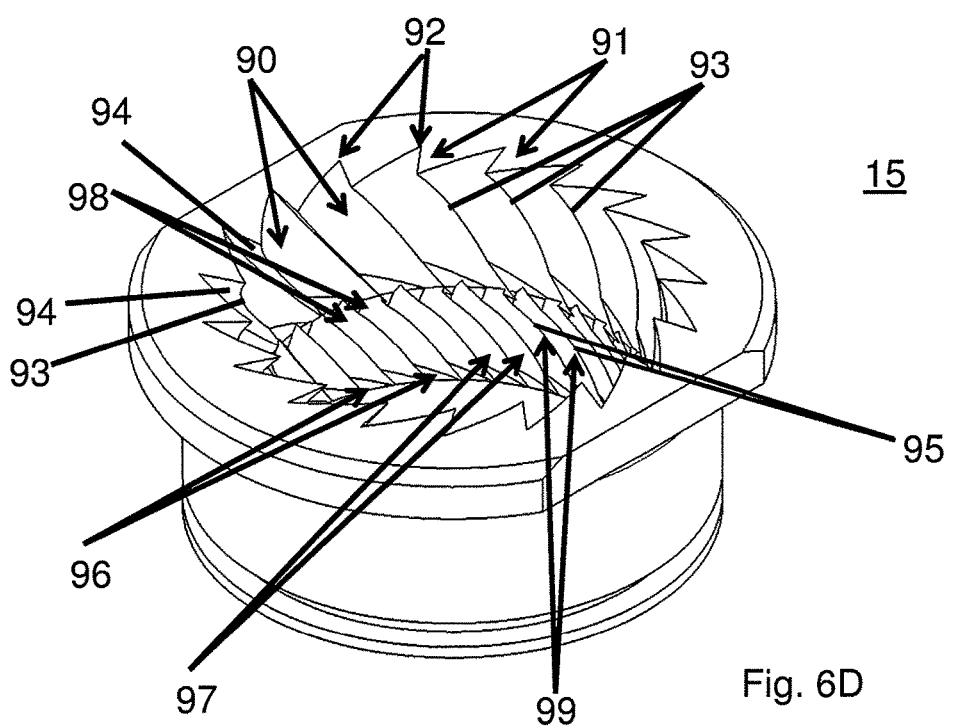
FIG. 6D shows the grinding ring according to FIG. 6A or 6C, respectively, in perspective single view.

In the same manner as the grinding cone 11 shown in FIG. 63, the grinding ring 15 is also embodied in two stages: in the upper area of the grinding ring 15 in FIG. 6D, the number of the grinding grooves 90 is smaller than the corresponding number of grinding grooves 96 in the lower area of the grinding ring 15. In the assembled state of the grinder 1 according to the invention, a part of the grinding cone 11 and of the grinding ring 15 are thus arranged adjacent to the entrance slit 20 with a comparatively small number of grinding grooves 60 or 90, respectively, while a part of the grinding cone 11 and of the grinding ring 15 comprising a comparatively higher number of grinding grooves 66 or 96, respectively, are located opposite to each other adjacent to the exit slit 28 of said grinder 1. A two-stage grinder 1, which grinds coffee beans 3 very finely, is created through this in an advantageous manner.

As has been described above analogously with reference to the grinding grooves 90, the lower grinding grooves 96 shown in FIG. 6D in each case also encompasses a tooth 97, which, in turn, in each case has a grinding foot 98 as well as a grinding edge 95; provision is also made for a respective grinding surface 99, which adjoins the grinding edge 95.

Figure 6E:
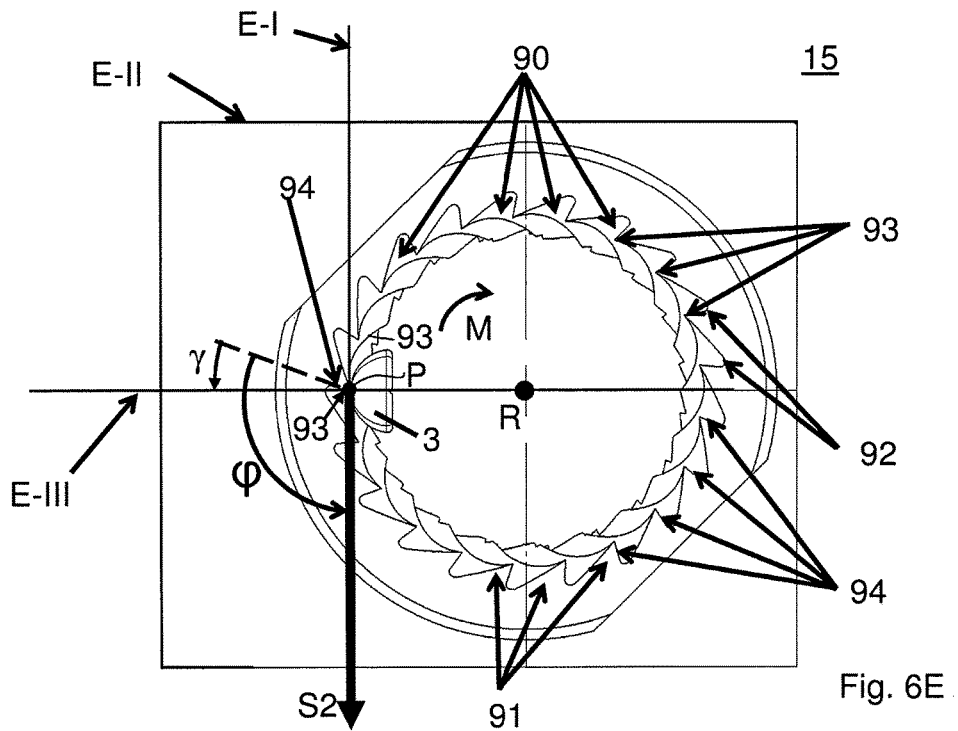
FIG. 6E shows a simplified top view onto the grinding ring of FIG. 4 for illustrating an angle of inclination.

FIG. 6E shows the grinding ring 15 in simplified top view. The grinding ring 15 encompasses the described number of grinding grooves 90, teeth 91, grinding feet 92, grinding edges 93 and grinding surfaces 94. A coffee bean 3 rests against a grinding surface 94 in the point P. In response to a rotation of the grinding cone, which is not shown in this FIG. 6E, about the axis of rotation R in the direction of rotation M, a grinding direction S2, which is located in the assumed working direction E-II, results for the coffee bean 3 in the point P on the grinding surface 94 (wherein the grinding direction S2 specifies the direction, in which the point P moves relative to the grinding cone, that is, oriented opposite to the direction of rotation M of the grinding cone). The tool reference plane E-I for the point P of FIG. 6E is embodied parallel to the grinding direction S2 and parallel to the axis of rotation R and thus stands quasi vertically to the paper plane. The grinding edge plane E-III, in turn, goes through the point P and stands vertically on the tool reference plane E-I.

As can be seen from FIGS. 6D and 6E, each grinding surface 94 is arranged such that it defines one of the grinding grooves 9 of the grinding ring 15 at a rear side of the respective grinding groove 90 relative to the grinding direction S2. Accordingly, each grinding surface 99 is arranged such that it defines one of the grinding grooves 96 of the grinding ring 15 at a rear side of the respective grinding groove 96 relative to the grinding direction S2.

According to the invention, the grinding surface 94 is inclined in the point P against the tool reference plane E-I at an angle, which is greater than 90° and smaller than 180°. More precisely, the grinding surface 94 has an angle of inclination φ of 110° in the point P, for example, with respect to the tool reference plane E-I, measured at the assumed working plane E-II in the direction of the grinding direction S2. The angle of inclination φ is positive, because, based on the grinding surface 94, it is observed in the direction of the tool reference plane E-I or in the direction of the grinding direction S2, respectively, in counter-clockwise direction.

Due to this grinding surface 94, which is adjusted in such a manner according to the invention, it is possible in an advantageous manner to cut the coffee bean 3 effectively and to achieve the advantages of the invention, which have already been mentioned above.

It is important to note that a representative angle of inclination φ of the area of the grinding ring 15, which is adjacent to the entrance slit 20, has been shown in the exemplary embodiment considered herein. However, it shall be understood as having been disclosed in the context of the invention that the grinding surfaces 99, which are adjacent to the exit slit 28 and which in each case define one of the grinding grooves 96, in each case encompass an angle of inclination φ, which is greater than 90° and smaller than 180°.

In the same manner as the grinding ring 15, the grinding cone 11 can also be equipped with grinding surfaces, which encompass an angle of inclination φ, which is greater than 90° and smaller than 180°, as will now be explained by means of FIGS. 7A and 7B.

Figure 7A:
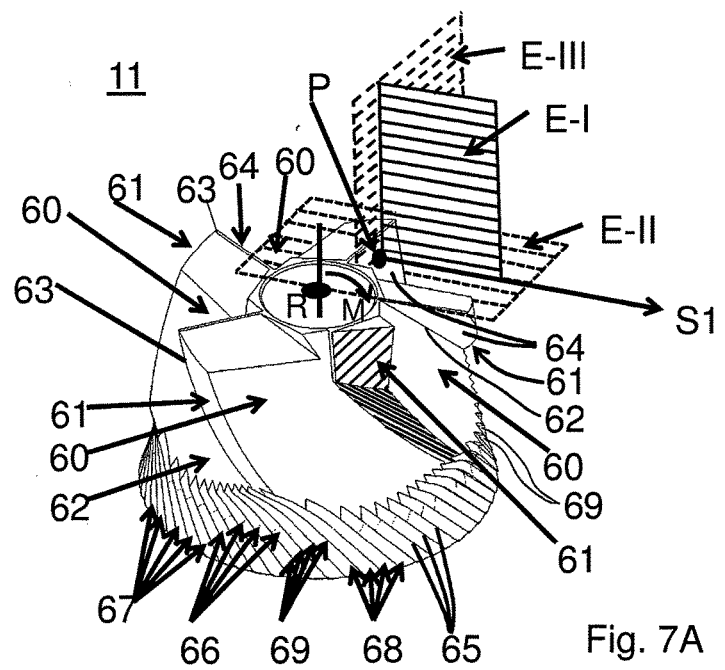
FIG. 7A shows an alternative embodiment of a grinding cone according to the instant invention in perspective view.

In its upper area, the grinding cone 11 shown in FIG. 7A encompasses five grinding grooves 60, which are arranged so as to be distributed evenly across the circumference and which are adjacent to the entrance slit 20 of the grinding apparatus 5 in a coffee machine. Each of these grinding grooves 60 encompasses corresponding teeth 61 (one of which is illustrated so as to be cut), grinding feet 62, grinding edges 63 and grinding surfaces 64, as is already described per se with reference to FIG. 6B. The grinding grooves 60 run spirally or helically, respectively, about the axis of rotation R of the grinding cone 11.

In this case, the grinding cone 11 is also embodied in two stages, in that, in addition to the above-described grinding grooves 60, etc., provision is made for further grinding grooves 66 and teeth 67, in each case comprising a grinding foot 68, a grinding edge 65 and a grinding surface 69 adjoining the grinding edge, in the lower region thereof, thus adjacent to the exit slit 28 of the assembled grinding apparatus 5, wherein the number of the last-mentioned grinding surfaces 69 is significantly greater than the number of the first-mentioned grinding surfaces 64; for the sake of clarity, not all of the corresponding components are identified in FIG. 7A. The grinding grooves 66 also run spirally or helically, respectively, at the outer side of the grinding cone 11.

An arbitrary point P is chosen on a grinding surface 64 of a tooth 61. Said arbitrary point P rotates on a circular path (not shown) about the axis of rotation R in the direction of rotation M. According to the above-mentioned convention, this results in an assumed grinding direction S1, as it can be gathered from FIG. 7A. The tool reference plane E-I is a plane in the point P, which is embodied parallel to the grinding direction S1 and parallel to the axis of rotation R. The assumed working plane E-II follows as plane, which is oriented orthogonally to the axis of rotation R and parallel to the grinding direction S1, through the point P, and the grinding edge plane E-III then stands as plane through the point P and vertically on the tool reference plane E-I and vertically to the working plane E-II or vertically to the grinding direction S1, respectively.

Figure 7B:
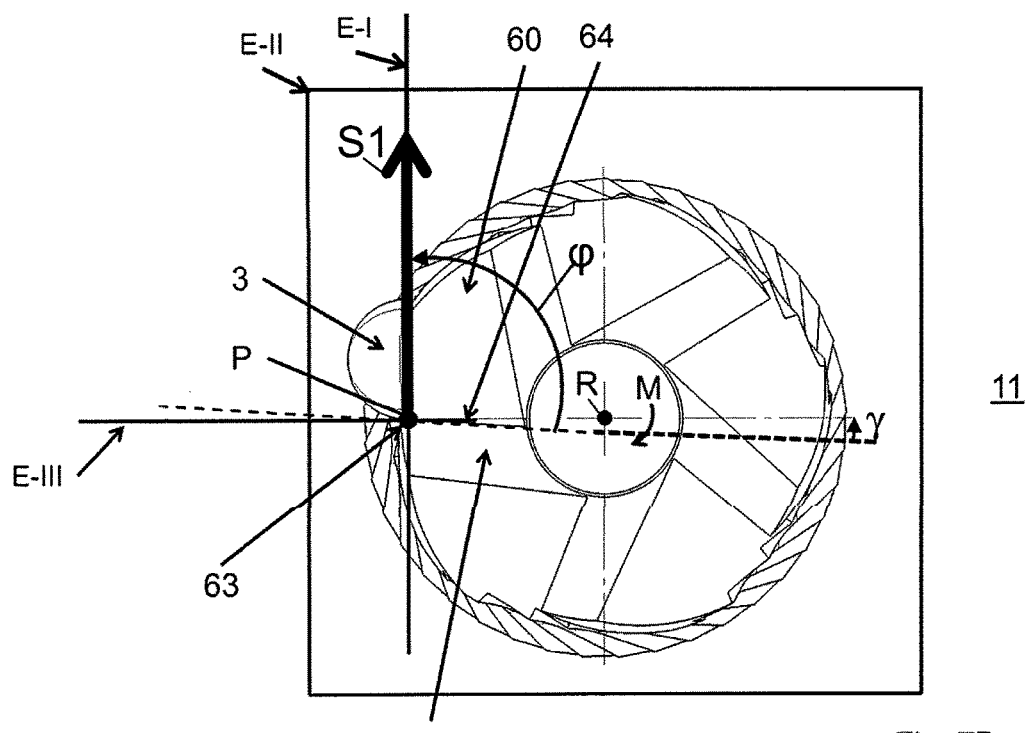
FIG. 7B shows the grinding cone according to FIG. 7A in top view.

The grinding cone 11 shown in FIG. 7A is illustrated in FIG. 7B in top view (in contrast to FIG. 7A, all of the teeth of the grinding cone 11 are illustrated so as to be uncut). A coffee bean 3 rests partially against the point P, which is located on the grinding surface 64 of the tooth 61, which is observed herein. The planes E-I, E-II and E-III, which can be seen form FIG. 7A, are also shown in FIG. 7B.

According to the invention, the angle of inclination φ of the grinding surface 64 in the point P is the angle between this grinding surface 64 and the tool reference plane E-I, measured at the assumed working plane E-II in the direction of the grinding direction S1. The angle of inclination φ is also positive herein, because it is observed starting at the grinding surface 64 in the direction tool reference plane E-I or in the direction of the grinding direction S1, respectively, in counter-clockwise direction. The angle of inclination φ shown in this exemplary embodiment is 93° and, according to the invention, is thus greater than 90° and smaller than 180°, but other angles of inclination φ can be advantageous, depending on the embodiment of the grinding cone 11 and/or of the grinding ring 15, in particular with regard to the respective number or dimensioning of the grinding grooves 60, 66 or 90, 96, respectively, and/or of the material.

As can be seen from FIGS. 7A and 7B, each grinding surface 64 is arranged such that it defines one of the grinding grooves 60 of the grinding cone 11 at a rear side of the respective grinding groove 60 relative to the grinding direction S1. Accordingly, each grinding surface 69 is arranged such that it defines one of the grinding grooves 66 of the grinding cone 11 at a rear side of the respective grinding groove 66 relative to the grinding direction S1.

It is important to emphasize expressly at this point that the angle of inclination φ has only been explained at a designated point P. This means, conversely, that all of the other grinding surfaces 64 as well as 69 also encompass angles of inclination φ, which are identical to the shown angle of inclination φ or which can deviate therefrom, wherein, according to the invention, it is greater than 90° and smaller than 180° in any event according to the defined convention.

By means of this grinding cone 11 according to the invention, it is possible in a particularly advantageous manner to cut coffee beans 3 effectively, which leads to a lower noise emission of the grinder 1, which is in operation, and to a gentle comminution of the coffee beans 3.

Figure 8A:
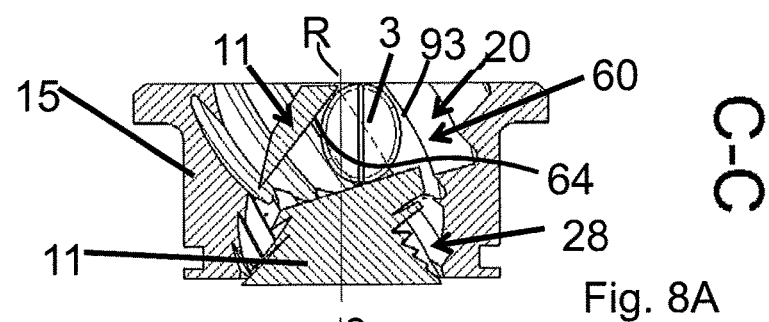
FIG. 8A shows the arrangement of a coffee bean in a grinding cone and grinding ring according to the invention in cut longitudinal view.
Figure 8B:
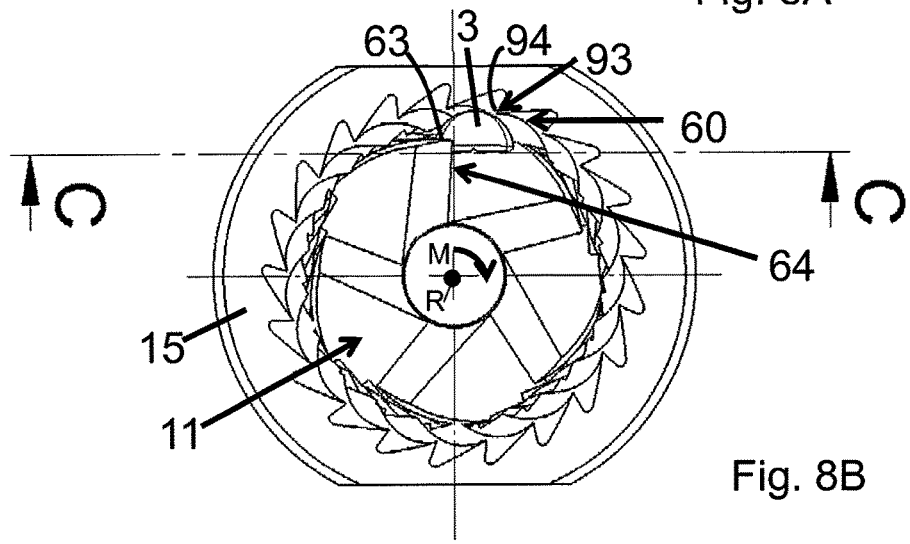
FIG. 8B shows the grinding cone and grinding ring of FIG. 8A in top view.
Figure 9A:
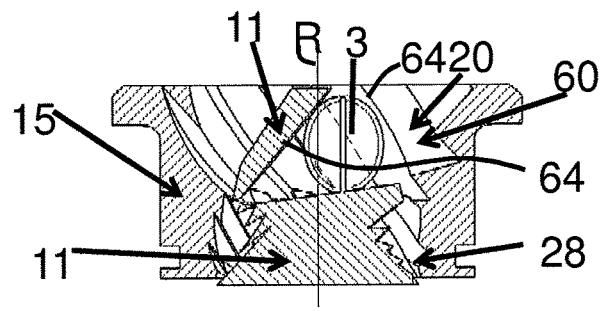
FIG. 9A shows the position of a coffee bean after a small rotation of the grinding cone according to FIG. 8A in cut longitudinal view.
Figure 9B:
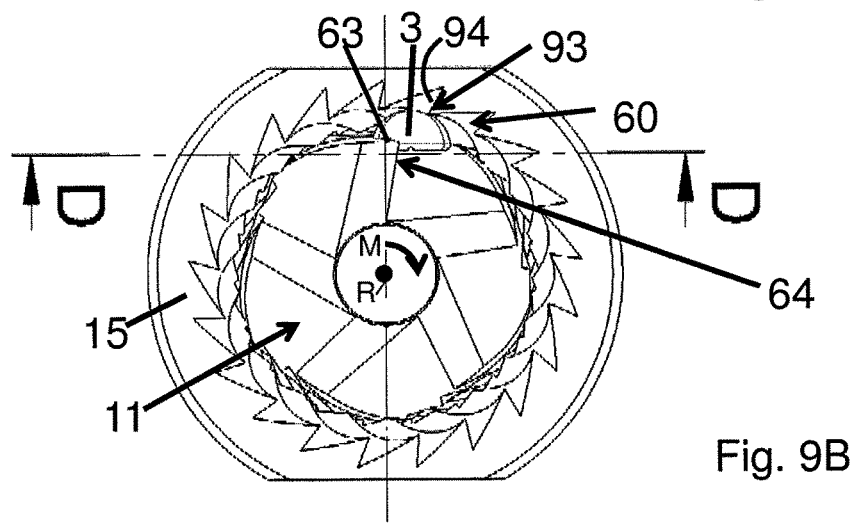
FIG. 9B shows the grinding cone and grinding ring of FIG. 9A in top view.
Figure 10A:
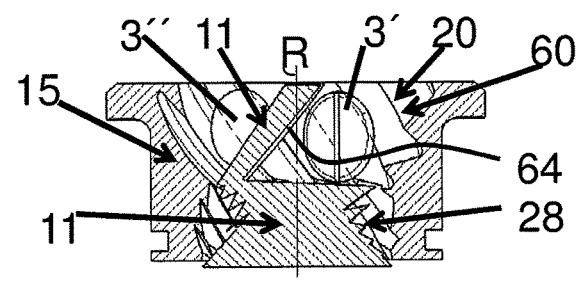
FIG. 10A shows the position of the coffee bean of FIGS. 8A and 9A, after the grinding cone has rotated further, in cut longitudinal view.
Figure 10B:
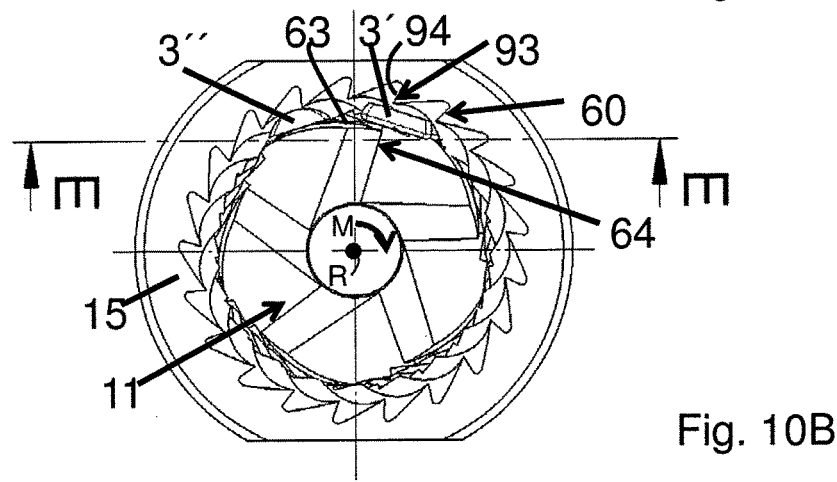
FIG. 10B shows the grinding cone and the grinding ring of FIG. 10A in top view.

It shall now be illustrated below in an exemplary manner, how a coffee bean 3, which is located in a grinder 1, which is embodied in accordance with the invention, is ground. Concretely, FIGS. 8A, 9A and 10A show a grinding cone 11 and a grinding ring 15 of the type according to the invention in a sectional side view. The arrangements of the respective sectional views C-C, D-D or E-E, respectively, are shown by means of FIGS. 8B, 9B and 10B, which in each case represent a top view onto the grinding cone 11 and the grinding ring 15 according to the sectional view of FIG. 8A, 9A or 10A, respectively.

A coffee bean 3, which has not been cut yet, is located in a grinding slit 60 in the entrance slit 20 shown in FIG. 8A between the grinding cone 11 (which can be embodied according to FIG. 7A, for example) and the grinding ring 15 (which can be embodied according to FIG. 6E, for example). The upper edge of the coffee bean 3 shown in FIG. 8A concludes with the upper edge of the grinding ring 15.

As soon as the drive motor 80 (not illustrated herein) is started, the grinding cone 11 rotates about the axis of rotation R in the direction of rotation M. The coffee bean 3 in FIG. 9A and FIG. 9B is thereby moved to the right as well as downwards in the grinding groove 60 (FIG. 9A), which, to some extent, corresponds in reality to a spiral or helical movement, respectively, of the coffee bean 3 in the direction of the exit slit 28. As can be gathered from FIG. 9A, the upper end of the coffee bean 3 is no longer at the upper edge of the grinding ring 15. The grinding edge 63 now cuts into the coffee bean 3, while it rests against a grinding edge 93 of the grinding ring 15. The grinding surface 64 thereby glides into the coffee bean 3, so that a section of the coffee bean 3 glides across the grinding surface 64. Accordingly, the grinding edge 93 of the grinding ring 15 cuts into the coffee bean 3 (from a side located opposite the grinding edge 83). The grinding surface 94 thereby also glides into the coffee bean 3, so that a section of the coffee bean 3 glides across the grinding surface 94.

In response to continued rotation of the drive motor 80 in the direction of rotation M, the grinding surfaces 64 and 94 move further through the coffee bean 3 and cut it into two coffee bean sections 3' or 3", respectively, wherein the two parts have moved further in the direction of the exit slit 28. In response to a continued rotation of the drive motor 80, the coffee bean sections 3' or 3", receptively, move further through the grinding apparatus 5, wherein they are continued to be cut by means of the engagement with the grinding surfaces 64 or 94, respectively, which are located at the grinding cone 11 and the grinding ring 15, until they leave the grinding apparatus from the exit slit 28 in powder form.

In contrast to the method known from the state of the art, a coffee bean 3 is thus not crushed, but is effectively cut. This is associated in an advantageous manner with a lower noise development, a lower current consumption of the drive motor 80 as well as with a gentle treatment of the coffee bean 3.

Conical grinders were in each case the subject matter of the above-described embodiments of the device according to the invention. However, the invention also comprises disk grinders, as will be specified below.

Figure 11:
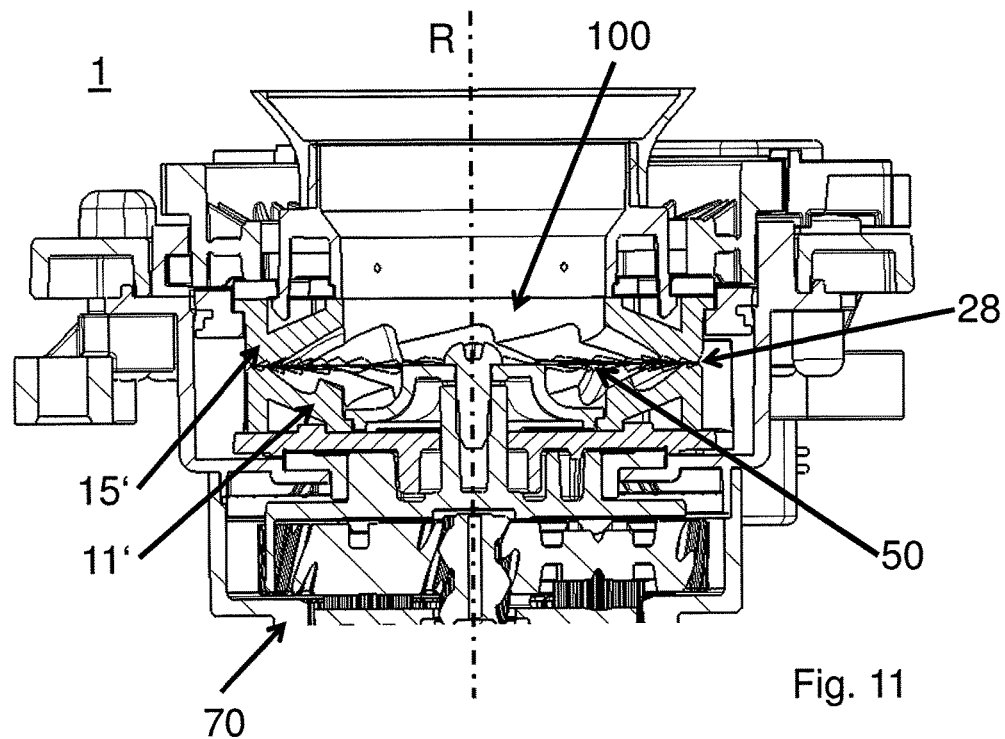
FIG. 11 shows a grinder according to the invention, which is embodied as disk grinder, in cross sectional view.

A part of a grinder 1 is thus shown in FIG. 11 in cross sectional view comprising a first grinding disk 11' and a second grinding disk 15'. Disk grinders are known per se from the state of the art, so that detailed explanations in this regard are not necessary at this point. In particular, it is known from the state of the art that the first grinding disk 11' rotates about an axis of rotation R by means of drive motor 80 (not shown herein) and drive 70 connected thereto. In contrast, the second grinding disk 15' is arranged in a torque proof manner in the grinder 1, but coaxially with the first grinding disk 11'. A grinding slit 50 is located between the first grinding disk 11' and the second grinding disk 15'. The supply of coffee beans 3 (not illustrated herein) to the first or second grinding disk 11' or 15', respectively, takes place through an opening 100 in the second grinding disk 15' in the vicinity of the axis of rotation R. The grinding slit 50 extends radially to the outside between the first grinding disk 11' and the second grinding disk 15' and forms an exit slit 28, through which coffee powder can be discharged from the grinding slit 50 during operation of the grinder 1, at the outer edge of the first grinding disk 11' or the second grinding disk 15', respectively.

Figure 12:
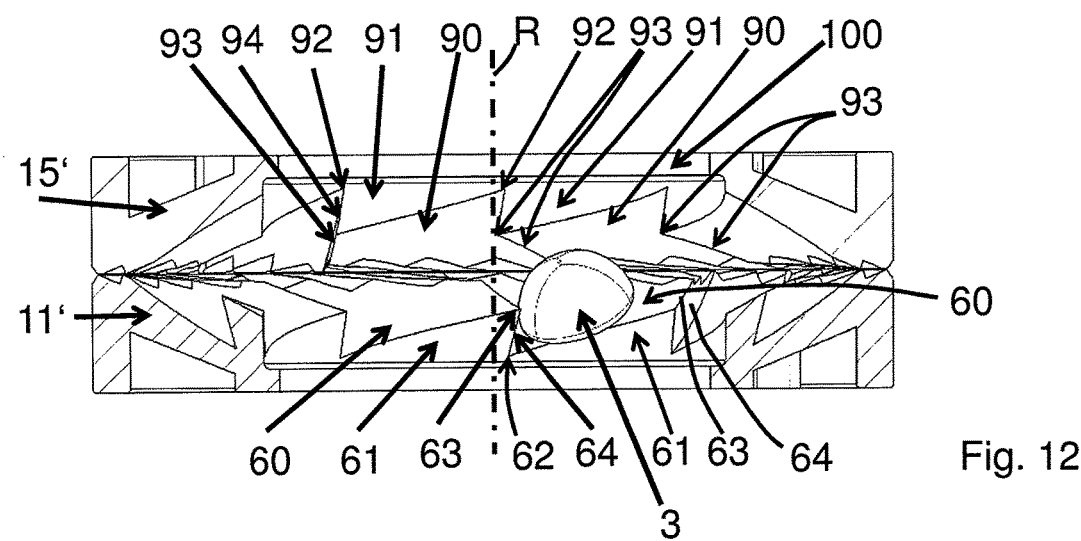
FIG. 12 shows an enlarged view of the first and second grinding disk shown in FIG. 11.

An enlarged view of the first grinding disk 11' and second grinding disk 15' shown in FIG. 11 is illustrated in FIG. 12, which additionally shows an exemplary position of an unground coffee bean 3. In response to operation of a corresponding coffee machine (not illustrated herein), the coffee bean 3 reaches through the opening 100 onto the first grinding disk 11'. It encompasses a number of in particular grinding grooves 60 and teeth 61, which extend in longitudinal direction of one of the grinding grooves, in each case comprising a grinding edge 63 and a grinding surface 64 adjoining the grinding edge 63, as has already been described above with reference to conical grinders. The second grinding disk 15' encompasses a number of grinding grooves 90 and teeth 91, in each case comprising a grinding foot 92, a grinding edge 93 and a grinding surface 94 adjoining the grinding edge, as has already been described above with reference to conical grinders. It is important to note that, for the sake of clarity, only a part of these available components has been identified in FIG. 12.

Figure 13A:
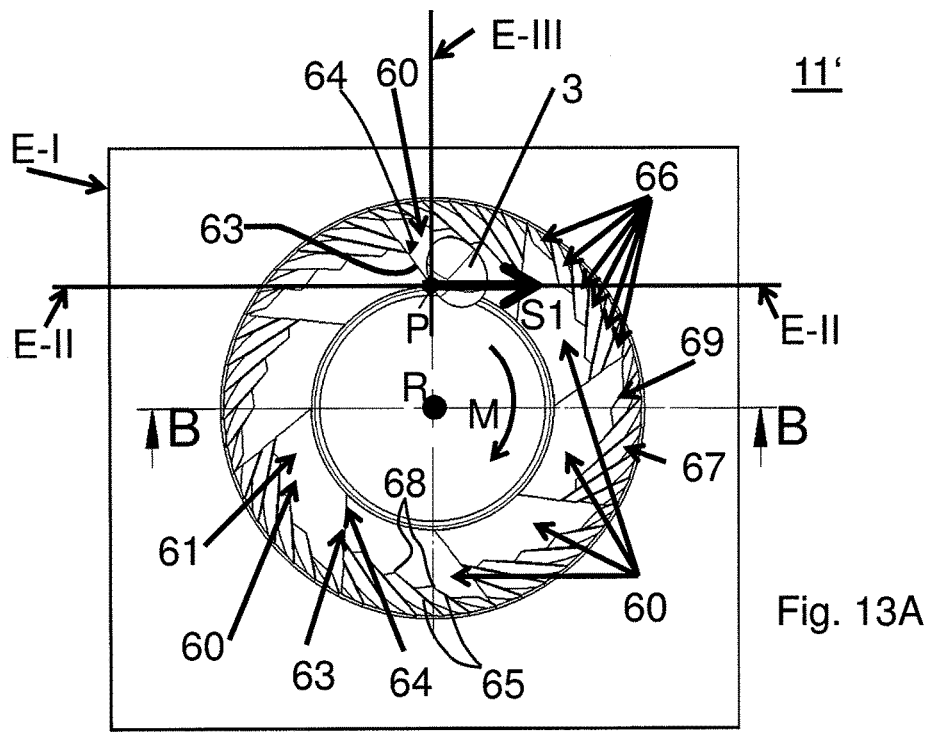
FIG. 13A shows the first grinding disk of FIG. 11 individually in top view.

The first grinding disk 11' is illustrated individually in top view in FIG. 13A. Radially on the inside and evenly distributed, the first grinding disk 11' encompasses eight grinding grooves 60, which increase the area located radially on the inside in the direction of the area located radially on the outside; however, this is not mandatory, and the grinding grooves can also encompass a constant width in radial direction. A coffee bean 3 is located in one of the shown grinding grooves 60.

The grinding apparatus 5 according to the invention, which is embodied as disk grinder, can also be embodied in two stages, as can be gathered from FIG. 13A: This is so, because each grinding groove 60, in turn, encompasses six additional grinding grooves 66 located radially on the outside, which, in turn have teeth 67, in each case comprising a grinding foot 68, a grinding edge 65 and a grinding surface 69 adjoining the grinding edge 65, of which only a few are identified for the sake of clarity of the Figure described herein. The number of grinding grooves 60 or 66, respectively, can be chosen freely per se.

A fictitious point P is chosen such on a grinding surface 64 of the first grinding disk 11' such that a part of the coffee bean 3 is located in said point. The latter rotates about the axis of rotation R on a circular path (not shown) in the direction of rotation M. According to the above-described convention, the assumed grinding direction S1 shown in FIG. 13A follows as tangent through the point P to the circle (not shown), on which the point P moves. The tool reference plane E-I is then a plane in the point P, which is embodied parallel to the grinding direction S1 and vertically to the axis of rotation R. The assumed working plane E-II is the plane through the point P, which is oriented parallel to the axis of rotation R and parallel to the grinding direction S1, and the grinding edge plane E-III is the shown plane through the point P, which stands vertically on the tool reference plane E-I and vertically to the working plane E-II or vertically to the grinding direction S1, respectively.

Figure 13B:
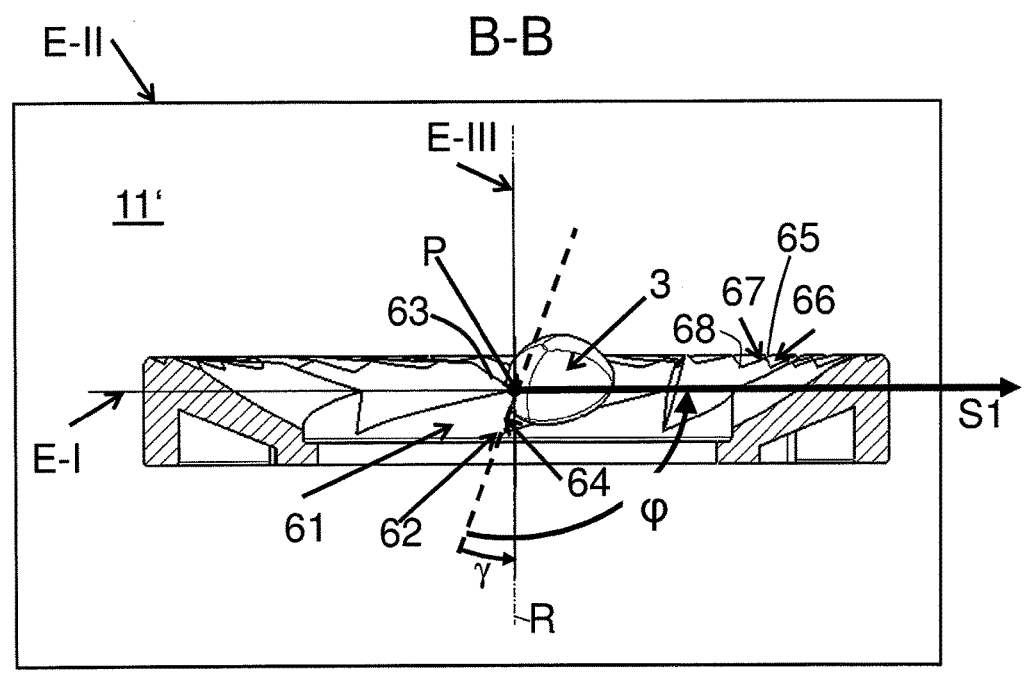
FIG. 13B shows the grinding disk shown in FIG. 13A in cut side view.

FIG. 13B represents a cross section through the first grinding disk 11' along the cutting line B-B in FIG. 13A. The tooth 61 encompasses a grinding foot 62, a grinding edge 63 and a grinding surface 64 adjoining the grinding edge 63 (as has, on principle, already been described above). The coffee bean 3 rests against the grinding surface 64 in a grinding groove 60 in the point P. The point P moves on a circular path about the axis of rotation R in the direction of rotation M (see FIG. 13A). Based on the above-descried convention, the assumed grinding direction S1 follows, that is, it is a tangent through the point P to the (non-illustrated) circle, on which the point P moves. Based on this, the tool reference plane E-I in the point P is located parallel to the grinding direction S1 and vertically to the axis of rotation R. The working plane E-II is then the plane through the point P, which is oriented parallel to the axis of rotation R and parallel to the grinding direction S1, and the grinding edge plane E-III follows as plane through the point P, which stands vertically on the tool reference plane E-I and vertically to the working plane E-II.

As can be seen from FIGS. 13A and 13B, each grinding surface 64 of the first grinding disk 11' is arranged such that it defines one of the grinding grooves 60 of the first grinding disk 11' at a rear side of the respective grinding groove 60 relative to the grinding direction S1. Accordingly, each grinding surface 69 of the first grinding disk 11' is arranged such that it defines one of the grinding grooves 66 of the first grinding disk 11' at a rear side of the respective grinding groove 66 relative to the grinding direction S1.

The angle of inclination $\varphi$ between the grinding surface 64 and the tool reference plane E-I, measured at the assumed working plane E-II in the direction of the cutting direction S1, is illustrated in FIG. 13B. In the exemplary embodiment at hand herein, the angle of inclination $\varphi$ is 110° and is thus greater than 90° and smaller than 180° in accordance with the invention. It is important to note that such an angle of inclination $\varphi$ is also defined for the grinding surface 69, etc., which are located radially on the outside in FIG. 13A; for the sake of clarity of FIGS. 13A and 13B, however, the illustration thereof was forgone. Depending on the embodiment of the first grinding disk 11' and/or of the second grinding disk 15', other angles of inclination $\varphi$ can also be advantageous, in particular with regard to the respective number or dimensioning of the grinding grooves 60 or 66, respectively, and/or of the material. It is also possible in accordance with the invention to provide different angles of inclination $\varphi$ at every tooth 61 or 67, respectively.

Figure 14A:
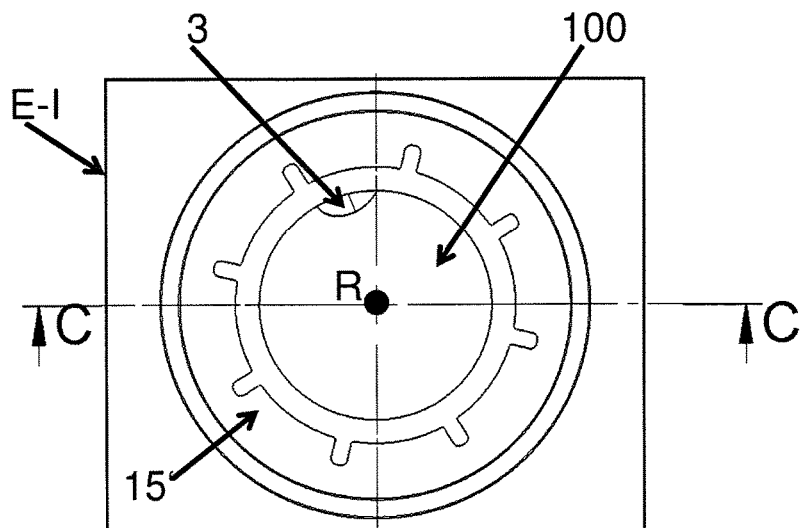
FIG. 14A shows the second grinding disk of FIG. 11 individually in top view.

The second grinding disk 15' shown in FIG. 11 is shown individually in an enlarged manner in top view in FIG. 14A. A part of a coffee bean 3 can be seen through the opening 100. The tool reference plane E-I is located in the paper plane of this figure.

Figure 14B:
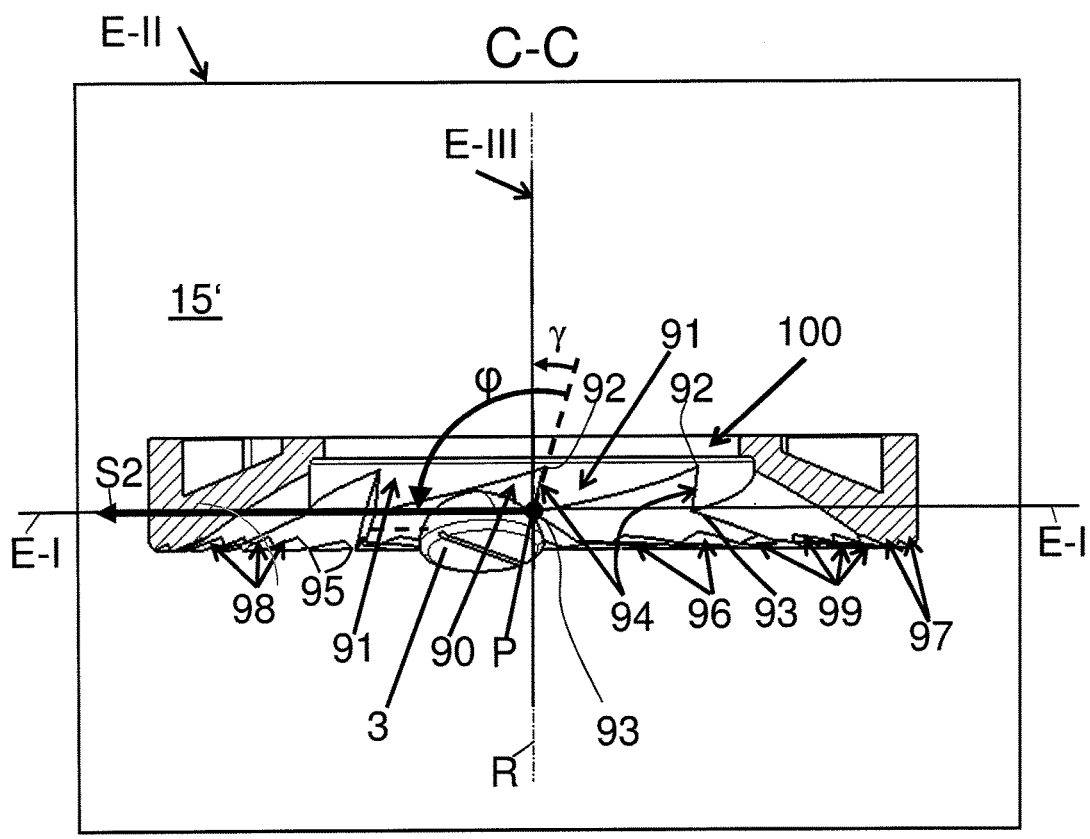
FIG. 14B shows the grinding disk shown in FIG. 14A in cut side view.

The second grinding disk 15', which is shown in FIG. 14A, is illustrated in FIG. 14B in a sectional side view along the cutting line C-C of FIG. 14A. Grinding grooves 90 are arranged radially on the inside so as to be distributed evenly across the circumference of the second grinding disk 15', which in each case—as already described above—encompass a tooth 91 comprising a grinding edge 93 and comprising a grinding surface 94, which adjoins the grinding edge 93. Provision is made radially on the outside for further grinding grooves 96, which form a second grinding stage, and for teeth 97, which extend along one of the grinding grooves 96, in each case comprising a grinding edge 95 and a grinding surface 99, which adjoins the grinding edge 95, which are smaller as compared to the grinding grooves 90 etc., which are located radially on the inside, but which are more numerous. Only a part of these components is identified for the sake of clarity of FIG. 14B described herein.

The coffee bean 3 rests against the grinding surface 94 or against the grinding edge 93, respectively, in a grinding groove 90 in the point P. The point P moves relative to the first grinding disk 11' (not illustrated in FIG. 14B) on a (non-illustrated) circular path about the axis of rotation R opposite to the direction of rotation M (see FIG. 13A). The assumed grinding direction S2 follows based on the convention, which has already been described, that is, it is directed along a tangent through the point P to the (non-illustrated) circle, on which the point P moves relative to the first grinding disk 11'. Starting at this, the tool reference plane E-I in the point P is located parallel to the grinding direction S2 and vertically to the axis of rotation R. The assumed working plane E-II is the plane through the point P, which is oriented parallel to the axis of rotation R and parallel to the grinding direction S2, and the grinding edge plane E-III follows as plane through the point P, which stands vertically on the tool reference plane E-I and vertically to the working plane E-II or vertically to the grinding direction S2, respectively.

As can be seen from FIG. 14B, each grinding surface 94 of the second grinding disk 15' is arranged such that it defines one of the grinding grooves 90 of the second grinding disk 15' at a rear side of the respective grinding groove 90 relative to the grinding direction S2. Accordingly, each grinding surface 99 of the second grinding disk 15' is arranged such that it defines one of the grinding grooves 96 of the second grinding disk 15' at a rear side of the respective grinding groove 96 relative to the grinding direction S2.

The angle of inclination φ between the grinding surface 94 and the tool reference plane E-I, measured at the assumed working plane E-II in the direction of the cutting direction S2, is illustrated in FIG. 14B and is 110° in this exemplary embodiment. In accordance with the invention, it is thus greater than 90° and smaller than 180°. It is also important to note herein that the angle of inclination φ is also defined for the grinding surfaces 99, which are located radially on the outside in FIG. 14A; for the sake of clarity of FIGS. 14A and 14B, however, the illustration thereof was forgone.

Depending on the embodiment of the first grinding disk 11' and/or of the second grinding disk 15', other angles of inclination φ can also be advantageous, in particular with regard to the respective number or dimensioning of the grinding grooves 90 or 96, respectively, and/or of the material; it is also possible in accordance with the invention to provide different angles of inclination φ at every tooth 91 or 97, respectively.

It is important to note that the grinder 1 according to the invention cannot only be embodied in two stages, as described above: Instead, it is also possible to provide a one-stage grinder, in the case of which the number of the grinding grooves does not change, or to provide a multi-stage grinder, in the case of which the number of the grinding grooves increases in to or more stages, for example by means of a further number of grinding grooves as compared to the number shown in FIG. 6B or 13A, which is greater than the number of the grinding grooves 60 or 66, respectively, shown therein, or of the grinding grooves 90 or 96, respectively, shown in FIG. 6D or 14B. It is also possible to combine grinding cones, grinding rings or grinding disks known from the state of the art with corresponding grinding cones 11, grinding rings 15, first grinding disks 11' or second grinding disks 15', respectively, according to the invention.

Provision can furthermore be made that it is not the grinding cone 11 or the first grinding disk 11', respectively, which are driven by means of the drive motor 80, but the grinding ring 15 or the second grinding disk 15', respectively, or an arbitrary combination thereof.

Advantageously, the grinder 1 according to the invention can be made of metal, in particular hard metal, and/or ceramic materials, which fulfil the required material hardness as well as the conditions required for use in food or luxury food, respectively, in particular with regard to food safety.

Typically, the coffee beans 3 have a length of approximately 7 to 16 mm, a width of approximately 7 to 12 mm and a height of approximately 4 to 7 mm. Surprisingly, it turned out that the following characteristics offer a particularly advantageous effect in view of the solution of the task on which the invention is based (in particular in view of a gentle and fine as well as homogenous grinding of the coffee beans 3):

In the case of a grinder 1 according to the invention, which is embodied as two-stage conical grinder, the grinding cone 11 should preferably encompass substantially between 4 and 7 grinding edges 63 in the area of the entry slit 20, wherein the grinding surfaces 64 that adjoin one of the grinding edges 63 should in each case have a length of between substantially 1 and 25 mm (in this context, the "length" of the grinding surface 64 of a particular tooth 61 is considered to be the extension of the grinding surface 64 measured in a plane being arranged perpendicular to the axis of rotation R, i.e. parallel to the assumed working plane E-II shown in FIGS. 7A and 7B; said length of grinding surface 64 of a particular tooth 61 corresponds to the "height" of tooth 61 being defined as distance between grinding edge 63 of tooth 61 and grinding foot 62 of tooth 61 in a plane being arranged perpendicular to the axis of rotation R). In the area of the exit slit 28, the grinding cone 11 should preferably encompass substantially 40 to 60 grinding edges 65, wherein the grinding surfaces 69 that adjoin one of the grinding edges 65 in each case comprise a length of substantially 1 to 20 mm (in this context, the "length" of the grinding surface 69 of a particular tooth 67 is considered to be the extension of the grinding surface 69 measured in a plane being arranged perpendicular to the axis of rotation R, i.e. parallel to the assumed working plane E-II shown in FIGS. 7A and 7B; said length of grinding surface 69 of a particular tooth 67 corresponds to the "height" of tooth 67 being defined as distance between grinding edge 65 of tooth 67 and grinding foot 68 of tooth 67 in a plane being arranged perpendicular to the axis of rotation R). The total height of the grinding cone 11 should substantially be between 18 and 22 mm. The height of the grinding edges 65 (that is, the extension of the grinding edges 65 along the axis of rotation R) in the area of the exit slit 28 should substantially be between 4 and 12 mm.

In the area of the entrance slit 20, the grinding ring 15 according to the invention should advantageously encompass substantially 16 to 25 cutting edges 93, wherein the grinding surfaces 94 that adjoin one of the grinding edges 93 comprise a respective length of substantially 1 to 20 mm (in this context, the "length" of the grinding surface 94 of a particular tooth 91 is considered to be the extension of the grinding surface 94 measured in a plane being arranged perpendicular to the axis of rotation R, i.e. parallel to the assumed working plane E-II shown in FIGS. 6C and 6E; said length of grinding surface 94 of a particular tooth 91 corresponds to the "height" of tooth 91 being defined as distance between grinding edge 93 of tooth 91 and grinding foot 92 of tooth 91 in a plane being arranged perpendicular to the axis of rotation R). In the area of the exit slit 28, the grinding ring 15 should encompass substantially between 40 and 60 grinding edges 95, wherein the grinding surfaces 99 that adjoin one of the grinding edges 95 comprise a respective length of substantially 1 to 15 mm (in this context, the "length" of the grinding surface 99 of a particular tooth 97 is considered to be the extension of the grinding surface 99 measured in a plane being arranged perpendicular to the axis of rotation R, i.e. parallel to the assumed working plane E-II shown in FIGS. 6C and 6E; said length of grinding surface 99 of a particular tooth 97 corresponds to the "height" of tooth 97 being defined as distance between grinding edge 95 of tooth 97 and grinding foot 98 of tooth 97 in a plane being arranged perpendicular to the axis of rotation R). The total height, of the grinding ring 15 should substantially be between 18 and 22 mm. In the area of the exit slit 28, the height of the grinding edges 95 (that is, the extension of the grinding edges 95 along the axis of rotation R) should substantially be between 4 and 12 mm.

Due to the selection of the angle of inclination φ of a grinding surface of a tooth according to the relation 90°<φ<180°, it is attained that each grinding foot trails its corresponding grinding edge in response to the operation of the grinder according to the invention (with reference to the respective grinding direction S1 or S2, respectively). Through this, a cutting process is carried out in the case of the coffee beans, by means of which the advantages, on which the invention is based, are attained in an advantageous manner.

The above-described grinders can preferably be embodied such that 90.5°<φ<105° applies for the angle of inclination φ of a grinding surface of a tooth. On the one hand, the latter ensures that the grinders comminute the respective product, which is to be ground, by means of cutting. In this case, there is furthermore the advantage that grinding surfaces comprising an angle of inclination φ with 90.5°<φ<105°, can be produced in a simple and in particular in a cost-efficient manner, for example by means of machining a workpiece by means of milling or slotting. It is furthermore ensured in this case that the teeth of the grinders encompass a high mechanical stability and are thus particularly resistant against wear, so that the correspondingly equipped grinders have a long lifetime.

It is important to note that the spatial arrangement of the grinding surfaces of the grinding surfaces illustrated in the figures cannot only be characterized by a specification of the angle of inclination φ relative to the respective tool reference plane E-I, but also by specifying an angle γ between the grinding surface and the respective grinding edge plane E-III, in each case measured in the working plane E-II at the respective point P (at which the cutting edge plane E-III cuts both the tool reference plane E-I as well as the working plane E-II).

To illustrate this fact, an angle γ is drawn in FIG. 7B between the grinding surface 64 of the grinding cone 11, which grinding surface 64 adjoins the cutting edge 63, and the grinding edge plane E-III. The angle γ and the corresponding angle of inclination φ of the grinding surface 64 are connected according to the formula $$\varphi = \gamma + 90°.$$

In the case of the grinding surface 64, the angles γ and the corresponding angle of inclination φ in each case have the same algebraic sign. Under the condition that the relationship 90°<φ<180° applies for the angle of inclination φ, 0°<γ<90° follows. In combination with the grinding surface 64, the grinding edge 63 accordingly forms a part of a cutting tool, which, in response to a movement in the grinding direction S1, provides for a machining of a workpiece comprising a flat surface, which is oriented parallel to the tool reference plane E-I. According to a common terminology for machining methods according to the standard DIN 6581, the angle γ corresponds to a "positive" chip angle of a cutting tool, the "chip surface" of which is formed by the grinding surface 64 of the grinding cone 11.

In addition, an angle γ is drawn in FIG. 6E between the grinding surface 94 of the grinding ring 15, which grinding surface 94 adjoins a grinding edge 93, and the grinding edge plane E-III. φ=γ+90° and 0°<γ<90° applies for the angle γ according to FIG. 6E (analogous to angle γ according to FIG. 7B). Accordingly, the grinding edge 93, in combination with the grinding surface 94, forms a part of a cutting tool, which, in response to a movement in the grinding direction S2, provides for a machining of a workpiece comprising a flat surface, which is oriented parallel to the tool reference plane E-I. According to a common terminology for machining methods according to the standard DIN 6581, the angle γ corresponds to a "positive" chip angle of a cutting tool, the "chip surface" of which is formed by the grinding surface 94 of the grinding ring 15.

Accordingly, an angle γ is drawn in FIG. 13B between the grinding surface 64 of the first grinding disk 11', which grinding surface adjoins a grinding edge 63, and the grinding edge plane E-III.

φ=γ+90° and 0°<γ<90° applies for the angle γ according to FIG. 13B (analogous to angle γ according to FIG. 7B). Accordingly, the grinding edge 63, in combination with the grinding surface 64, forms a part of a cutting tool, which, in response to a movement in the grinding direction S1, provides for a machining of a workpiece comprising a flat surface, which is oriented parallel to the tool reference plane E-I. According to a common terminology for machining methods according to the standard DIN 6581, the angle γ corresponds to a "positive" chip angle of a cutting tool, the "chip surface" of which is formed by the grinding surface 64 of the first grinding disk 11'.

Accordingly, an angle γ is drawn in FIG. 14B between the grinding surface 94 of the second grinding disk 15', which grinding surface 94 adjoins a grinding edge 93, and the grinding edge plane E-III.

φ=γ+90° and 0°<γ<90° applies for the angle γ according to FIG. 14B (analogous to angle γ according to FIG. 7B). Accordingly, the grinding edge 93, in combination with the grinding surface 94, forms a part of a cutting tool, which, in response to a movement in the grinding direction S2, provides for a machining of a workpiece comprising a flat surface, which is oriented parallel to the tool reference plane E-I. According to a common terminology for machining methods according to the standard DIN 6581, the angle γ corresponds to a "positive" chip angle of a cutting tool, the "chip surface" of which is formed by the grinding surface 94 of the grinding disk 15'.

Figure 2:
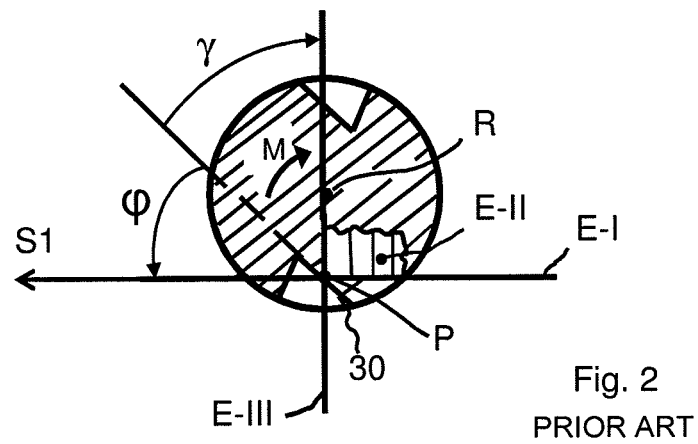
FIG. 2 shows a top view onto the grinding cone according to FIG. 1 in a section in the working plane comprising an angle of inclination according to the convention.
Figure 3:
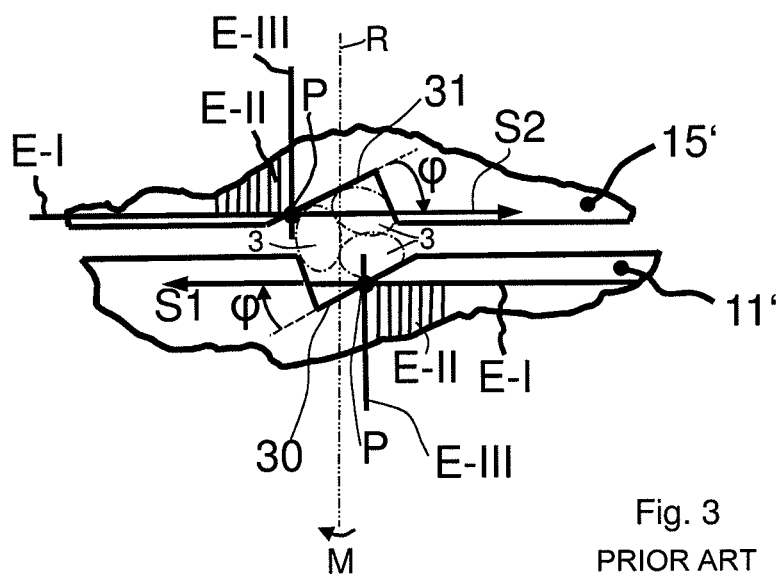
FIG. 3 shows a partial sectional view through a disk grinder of the state of the art comprising the reference planes and angles according to the convention.

To clarify a difference to the grinders according to the invention in accordance with FIGS. 4-14B, an angle γ is also drawn between the grinding surface 30 and the grinding edge plane E-III in the case of the grinding cone, which is illustrated in FIG. 2 and which belongs to the state of the art. In the case of FIG. 2, the angle γ and the corresponding angle of inclination φ have different algebraic signs, wherein φ=90°+γ also applies. Due to the fact, however, that the angle of inclination φ for the grinding cone according to FIG. 2 fulfils the condition 0°<φ<90°, −90°<γ<0° applies for the angle γ according to FIG. 2. Accordingly, the grinding surface 30 of the grinding cone according to FIG. 2 (state of the art) does not encompass a "positive" chip angle relative to the plane E-III.

The invention claimed is:

1. A grinder, which serves to grind coffee beans, comprising:
　　a first grinding disk, which has a number of teeth, which are spaced apart from one another and which are separated from one another by grinding grooves and which in each case encompass a grinding edge and a first grinding surface, which adjoins the grinding edge,
　　a second grinding disk, which has a number of teeth, which are spaced apart from one another and which are separated from one another by grinding grooves and which in each case encompass a grinding edge and a second grinding surface, which adjoins the grinding edge, wherein the first grinding disk and the second grinding disk are arranged coaxially along a common axis of rotation by forming a grinding slit, which extends between the first grinding disk and the second grinding disk and which in each case extend substantially vertically to the common axis of rotation, wherein the first grinding disk and the second grinding disk are configured to be rotated relative to one another about the common axis of rotation, so that, in response to a rotation of the first grinding disk relative to the second grinding disk, each of the first grinding surfaces of the first grinding disk is in each case moved in a grinding direction relative to the second grinding disk, so as to transport the coffee beans, which are to be ground, from an entrance slit of the grinder in the grinding grooves through the grinding slit to an exit slit, and to comminute them by means of the first grinding surfaces of the first grinding disk, wherein each first grinding surface of the first grinding disk is arranged such that it defines one of the grinding grooves of the first grinding disk at a rear side of the respective grinding groove relative to the grinding direction, wherein each first grinding surface of the first grinding disk encompasses an angle of inclination φ at an arbitrary point at the respective first grinding surface, relative to a tool reference plane, measured at an assumed working plane in the grinding direction of the respective first grinding surface, wherein the tool reference plane is a plane in the arbitrary point, which is embodied parallel to the grinding direction and vertically to the axis of rotation, and wherein the assumed working plane is a plane, which is oriented parallel to the axis of rotation and parallel to the grinding direction, through the arbitrary point, and wherein the angle of inclination φ of at least one of the first grinding surfaces of the first grinding disk fulfills the following condition: $90° < φ < 180°$.

2. The grinder according to claim 1 wherein the number of the teeth of the first grinding disk and/or of the second grinding disk is arranged so as to be distributed evenly across its respective circumference.

3. The grinder according to claim 1 wherein the first grinding disk and/or the second grinding disk encompasses a number of teeth, which differs from one another.

4. The grinder according to claim 1 wherein the number of the teeth of the first grinding disk and/or of the second grinding disk increases from the entrance slit of the respective grinder to the exit slit thereof.

5. The grinder according to claim 1, wherein the height of the teeth of the first grinding disk and/or of the second grinding disk decreases from the entrance slit of the respective grinder to the exit slit thereof.

6. The grinder according to claim 1, wherein the angles of inclination φ of the first grinding disk and/or of the second grinding disk differ from one another.

7. The grinder according to claim 1, wherein the teeth of the first grinding disk and/or of the second grinding disk are in each case arranged spirally in the direction of the axis.

8. The grinder according to claim 7, wherein the teeth of the first grinding disk and/or of the second grinding disk are in each case arranged as logarithmic spiral in the direction of the axis.

9. A coffee machine comprising a grinder according to claim 1.

10. A grinder, which serves to grind coffee beans, comprising:

a first grinding disk, which has a number of teeth, which are spaced apart from one another and which are separated from one another by grinding grooves and which in each case encompass a grinding edge and a first grinding surface, which adjoins the grinding edge, a second grinding disk, which has a number of teeth, which are spaced apart from one another and which are separated from one another by grinding grooves and which in each case encompass a grinding edge and a second grinding surface, which adjoins the grinding edge, wherein the first grinding disk and the second grinding disk are arranged coaxially along a common axis of rotation by forming a grinding slit, which extends between the first grinding disk and the second grinding disk and which in each case extend substantially vertically to the common axis of rotation, wherein the first grinding disk and the second grinding disk are configured to be rotated relative to one another about the common axis of rotation, so that, in response to a rotation of the second grinding disk relative to the first grinding disk, each of the second grinding surfaces of the second grinding disk is in each case moved in a grinding direction relative to the first grinding disk, so as to transport the coffee beans, which are to be ground, from an entrance slit of the grinder in the grinding grooves through the grinding slit to an exit slit, and to comminute them by means of the second grinding surfaces of the second grinding disk, wherein each second grinding surface of the second grinding disk is arranged such that it defines one of the grinding grooves of the second grinding disk at a rear side of the respective grinding groove relative to the grinding direction, wherein each of the second grinding surfaces of the second grinding disk encompasses an angle of inclination φ at an arbitrary point at the respective second grinding surface, relative to a tool reference plane, measured at an assumed working plane in the grinding direction of the respective second grinding surface, wherein the tool reference plane is a plane in the arbitrary point, which is embodied parallel to the grinding direction and vertically to the axis of rotation, and wherein the assumed working plane is a plane, which is oriented parallel to the axis of rotation and parallel to the grinding direction, through the arbitrary point, and wherein the angle of inclination φ of at least one of the second grinding surfaces of the second grinding disk fulfills the following condition: $90° < φ < 180°$.

11. The grinder according to claim 10, wherein the number of the teeth of the first grinding disk and/or of the second grinding disk is arranged so as to be distributed evenly across its respective circumference.

12. The grinder according to claim 10, wherein the first grinding disk and/or the second grinding disk encompasses a number of teeth, which differs from one another.

13. The grinder according to claim 10, wherein the number of the teeth of the first grinding disk and/or of the second grinding disk increases from the entrance slit of the respective grinder to the exit slit thereof.

14. The grinder according to claim 10, wherein the height of the teeth of the first grinding disk and/or of the second grinding disk decreases from the entrance slit of the respective grinder to the exit slit thereof.

15. The grinder according to claim 10, wherein the angles of inclination φ of the first grinding disk and/or of the second grinding disk differ from one another.

16. The grinder according claim 10, wherein the teeth of the first grinding disk and/or of the second grinding disk are in each case arranged spirally in the direction of the axis.

17. The grinder according claim 16, wherein the teeth of the first grinding disk and/or of the second grinding disk are in each case arranged as logarithmic spiral in the direction of the axis.

18. A coffee machine comprising a grinder according to claim 10.

\* \* \* \* \*